(12) United States Patent
He et al.

(10) Patent No.: US 12,744,644 B2
(45) Date of Patent: Sep. 22, 2026

(54) INFORMATION DETERMINATION METHOD AND DEVICE, ELECTRONIC DEVICE AND STORAGE MEDIUM

(71) Applicant: ZTE Corporation, Shenzhen (CN)

(72) Inventors: Zhen He, Shenzhen (CN); Shujuan Zhang, Shenzhen (CN); Zhaohua Lu, Shenzhen (CN); Jianwe Wang, Shenzhen (CN); Yu Ngok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 486 days.

(21) Appl. No.: 17/768,294

(22) PCT Filed: Sep. 29, 2020

(86) PCT No.: PCT/CN2020/118963

§ 371 (c)(1),
(2) Date: Apr. 12, 2022

(87) PCT Pub. No.: WO2021/068807

PCT Pub. Date: Apr. 15, 2021

(65) Prior Publication Data

US 2024/0106606 A1 Mar. 28, 2024

(30) Foreign Application Priority Data

Oct. 12, 2019 (CN) ........................ 201910969731.X

(51) Int. Cl.
*H04L 5/00* (2006.01)

(52) U.S. Cl.
CPC ............ *H04L 5/0053* (2013.01); *H04L 5/005* (2013.01)

(58) Field of Classification Search
CPC .. H04L 5/0048; H04L 1/1861; H04W 72/046; H04W 72/042
See application file for complete search history.

(56) References Cited

U.S. PATENT DOCUMENTS

2019/0141693 A1* 5/2019 Guo ................. H04W 72/1268
2019/0222284 A1 7/2019 Huang
(Continued)

FOREIGN PATENT DOCUMENTS

CN 109803423 A 11/2017
CN 108206714 A 6/2018
(Continued)

OTHER PUBLICATIONS

International Search Report for corresponding application PCT/CN2020/118963 filed Sep. 29, 2020: Mail date Dec. 31, 2020.
(Continued)

*Primary Examiner* — Derrick W Ferris
*Assistant Examiner* — Won Jun Choi
(74) *Attorney, Agent, or Firm* — CANTOR COLBURN LLP

(57) ABSTRACT

Embodiments of the present disclosure provide an information determination method and device, an electronic device and a storage medium. The method includes: determining a reference signal in a case where a preset condition is satisfied; and determining information of a downlink signal or downlink channel according to the reference signal. The embodiments of the present disclosure solve a problem that physical downlink shared channels (PDSCHs) of multiple component carriers (CCs) cannot be received normally due to conflict of the PDSCHs of the CCs in a time domain in the related art.

16 Claims, 6 Drawing Sheets

Determine a reference signal in a case where a preset condition is satisfied — S202

↓

Determine information of a downlink signal or downlink channel according to the reference signal — S204

(56) References Cited

U.S. PATENT DOCUMENTS

| | | | | |
|---|---|---|---|---|
| 2019/0297640 | A1 | 9/2019 | Liou | |
| 2020/0053775 | A1* | 2/2020 | Lee | H04W 74/0808 |
| 2020/0280483 | A1* | 9/2020 | Zhang | H04W 72/04 |
| 2020/0314818 | A1* | 10/2020 | Jin | H04W 72/046 |
| 2020/0337058 | A1* | 10/2020 | Song | H04L 5/0053 |
| 2020/0351888 | A1* | 11/2020 | Xu | H04W 72/23 |
| 2021/0051635 | A1* | 2/2021 | Lo | H04B 7/024 |
| 2022/0109541 | A1* | 4/2022 | Cirik | H04B 7/06966 |
| 2022/0150929 | A1* | 5/2022 | Matsumura | H04L 5/0044 |
| 2022/0216955 | A1* | 7/2022 | Kim | H04B 7/024 |
| 2022/0271890 | A1* | 8/2022 | Grossmann | H04L 5/0051 |

FOREIGN PATENT DOCUMENTS

| | | |
|---|---|---|
| CN | 109391405 A | 2/2019 |
| CN | 110268667 A | 9/2019 |
| CN | 111082912 A | 4/2020 |

OTHER PUBLICATIONS

NTT Docomo, Inc., "Summary for PDCCH structure and search space", 3GPP TSG RAN WG1 Meeting #96 Athens, Greece, Feb. 25-Mar. 1, 2019 R1-193339.

CATT, Considerations on multi-TRP/panel transmission, 3GPP TSG RAN WG1 #98bis, Chongqing China Oct. 14-20, 2019.

European Search Report for corresponding application EP20874427; Report dated Oct. 24, 2022.

Nokia, Enhancements on Multi-TRP/Panel Transmission, 3GPP TSG RAN WG1 #96 Meeting, Athens Greece, Feb. 25-Mar. 1, 2019.

* cited by examiner

1 Subframe

CC 1
PDSCH 1-1
slot 1-1

CC 2
PDSCH 2-1
PDSCH 2-2
slot 2-1
slot 2-2

CC 3
PDSCH 3-1
PDSCH 3-2
PDSCH 3-3
PDSCH 3-4
slot 3-1
slot 3-2
slot 3-3
slot 3-4

$t_1$ $t_2$ $t_3$ $t_4$

Reception Beam of CSI-RS 1-1
Reception Beam of CSI-RS 2-1
Reception Beam of CSI-RS 2-2
Reception Beam of CSI-RS 3-1
Reception Beam of CSI-RS 3-2
Reception Beam of CSI-RS 3-3
Reception Beam of CSI-RS 3-4

Reception Beam of CSI-RS 1

Reception Beam of CSI-RS 2

Reception Beam of CSI-RS 1

Reception Beam of CSI-RS 2

INFORMATION DETERMINATION METHOD AND DEVICE, ELECTRONIC DEVICE AND STORAGE MEDIUM

CROSS REFERENCE

This application is a National Stage Filing of the PCT International Application No. PCT/CN2020/118963 filed on Sep. 29, 2020, which claims priority to Chinese Application No. 201910969731.X filed with the China Intellectual Property Administration on Oct. 12, 2019, the entirety of which is herein incorporated by reference.

TECHNICAL FIELD

Embodiments of the present disclosure relate to the field of communications, and in particular to an information determination method and device, an electronic device and a storage medium.

BACKGROUND

In a conventional communication protocol, in a case where a time interval between downlink control information (DCI) received by user equipment (UE) and a physical downlink shared channel (PDSCH) scheduled by the DCI in a component carrier or serving cell (CC) is less than a preset threshold, the UE can determine a quasi-colocated (QCL) assumption of the PDSCH of the CC according to a QCL parameter (e.g., a source reference signal configured in QCL-Type D) of a control resource set (CORESET) with a minimum CORESET identifier (ID) on a latest slot of the CC. Similarly, in a case where the above situation occurs in multiple CCs, i.e., in a carrier aggregation (CA) scenario, the UE can determine a QCL assumption of the PDSCH of each CC according to a QCL parameter of a CORESET with a minimum CORESET ID on a latest slot of the CC. However, PDSCHs of multiple CCs possibly conflict in a time domain. In this case, QCL assumptions of PDSCHs of the CCs may be different, for example, source reference signals in QCL-Type D are different, that is, reception beams of PDSCHs of these CCs are different. However, the UE can only have one reception beam of the PDSCHs at a specific time, so the above situations may possibly cause the UE to fail to receive PDSCHs of multiple CCs at the same time. Similar situations may also occur in cross-CC scheduling scenarios, for example, DCI of CC1 schedules PDSCHs of CC1 and CC 2, and DCI of CC 3 schedules PDSCHs of CC 3 and CC 4. In a case where the above situations occur, the UE determines QCL assumptions of PDSCHs of CC 1 and CC 2 according to the first transmission configuration indicator (TCI) state in a TCI state set activated by a medium access control-control element (MAC-CE) signaling in CC 1, and determines QCL assumptions of PDSCHs of CC 3 and CC 4 according to the first TCI state in a TCI state set activated by an MAC-CE signaling in CC 3. In a case where the PDSCHs of the CCs conflict in a time domain and corresponding QCL assumptions are different, the UE possibly cannot receive PDSCHs of the CCs normally.

There is currently no effective solution to the above problems in the related art.

SUMMARY

Embodiments of the present disclosure provide an information determination method and device, an electronic device and a storage medium, which can at least solve a problem that PDSCHs of multiple CCs cannot be received normally due to conflict of the PDSCHs of the CCs in a time domain in the related art.

Some embodiments of the present disclosure provide an information determination method. The method includes: determining a reference signal in a case where a preset condition is satisfied; and determining information of a downlink signal or downlink channel according to the reference signal.

Some embodiments of the present disclosure provide an information determination device, which includes: a first determination module, configured to determine a reference signal in a case where a preset condition is satisfied; and a second determination module, configured to determine information of a downlink signal or downlink channel according to the reference signal.

Some other embodiments of the present disclosure provide a storage medium. The storage medium stores a computer program, and the computer program is configured to execute operations of any one of the above-described method embodiments at runtime.

Some other embodiments of the present disclosure provide an electronic device. The electronic device includes a memory and a processor, the memory stores a computer program, and the processor is configured to run the computer program to execute operations of any one of the above-described method embodiments.

According to the embodiments of the present disclosure, the reference signal is determined in the case where the preset condition is satisfied; and the information of the downlink signal or downlink channel is determined according to the reference signal, so as to solve the problem that the PDSCHs of multiple CCs cannot be received normally due to the conflict of the PDSCHs of the CCs in the time domain in the related art.

DETAILED DESCRIPTION

The present disclosure will be described in detail below with reference to the accompanying drawings in conjunction with embodiments.

It should be noted that "first", "second", etc. in the description, claims and above-mentioned accompanying drawings of the present disclosure are used for distinguishing similar subjects instead of being used for describing a specific order or precedence order.

Figure 1:
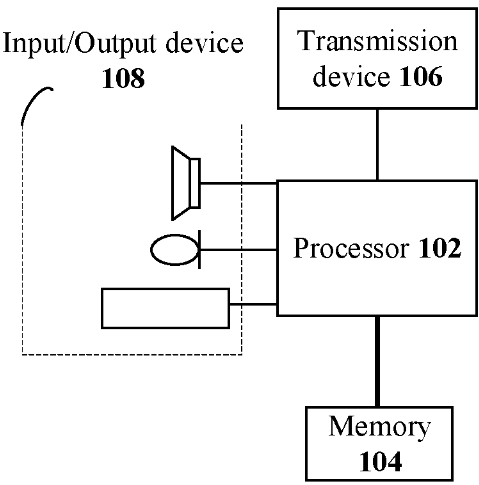
FIG. 1 is a structure block diagram of hardware of a mobile terminal of an information determination method according to the embodiments of the present disclosure.

The method embodiments in the embodiments of the present disclosure may be executed in a mobile terminal, a computer terminal or a similar computing device. Taking running on a mobile terminal as an example, FIG. 1 is a structure block diagram of hardware of a mobile terminal of an information determination method according to the embodiments of the present disclosure. As shown in FIG. 1, a mobile terminal 10 may include one or more (only one is shown in FIG. 1) processors 102 (the processor 102 may include, but not limited to, a processing device, for example, a microcontroller unit (MCU) or a field programmable gate array (FPGA)) and a memory 104 for storing data. In some exemplary implementations, the mobile terminal may further include a transmission device 106 with a communication function and an input/output device 108. Those having ordinary skill in the art will appreciate that the structure shown in FIG. 1 is merely schematic and does not pose a limitation on the structure of the mobile terminal described above. For example, the mobile terminal 10 may also include more or fewer components than that shown in FIG. 1, or have a different configuration from that shown in FIG. 1.

The memory 104 may be configured to store a computer program such as a software program and module of application software, for example, the computer program corresponding to the information determination method in the embodiments of the present disclosure, and the processor 102 executes various functional applications and data processing, i.e., achieve the above method, by running the computer program stored in the memory 104. The memory 104 may include a high-speed random access memory, and may also include a non-volatile memory, for example, one or more magnetic storage devices, flash memories, or other non-volatile solid-state memories. In some examples, the memory 104 may also include a memory remotely disposed with respect to the processor 102, and the remote memory may be connected to the mobile terminal 10 by means of a network. Examples of networks described above include, but not limited to, the Internet, enterprise intranets, local area networks, mobile communication networks, and combinations thereof.

The transmission device 106 is configured to receive or transmit data by means of one network. Specific examples of the network described above may include a wireless network provided by a communications provider of the mobile terminal 10. In one example, the transmission device 106 includes a network interface controller (NIC), which may be connected to other network devices by means of a base station so as to communicate with the Internet. In one example, the transmission device 106 may be a radio frequency (RF) module, which is configured to communicate wirelessly with the Internet.

Figure 2:
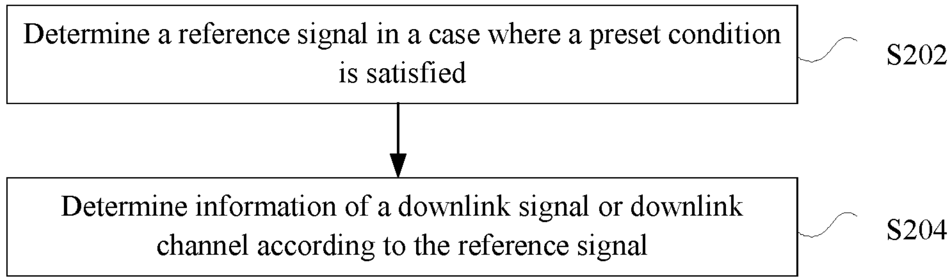
FIG. 2 is a flowchart of an information determination method according to the embodiments of the present disclosure.

The embodiment provides the information determination method, which runs on the above mobile terminal or on a network structure. FIG. 2 is a flowchart of an information determination method according to the embodiments of the present disclosure. As shown in FIG. 2, the flow includes the following operations.

At S202, a reference signal is determined in a case where a preset condition is satisfied.

At S204, information of a downlink signal or downlink channel is determined according to the reference signal.

The reference signal is determined according to first information, where the first information includes at least one of the following: a control resource set (CORESET) group corresponding to the downlink signal or downlink channel; a mapping table between a transmission configuration indicator (TCI) codepoint and a TCI state; a TCI state set activated for a data channel in a frequency domain bandwidth where the downlink signal or downlink channel is located; a relation between a carrier where a control channel for scheduling the downlink signal or downlink channel is located and a carrier where the downlink signal or downlink channel is located; and a type of the downlink signal.

In some exemplary implementations of the embodiment, the operation that the reference signal is determined according to the CORESET group corresponding to the downlink signal or downlink channel and the mapping table between the TCI codepoint and the TCI state includes the following operations that a CORESET group where a control channel corresponding to the downlink signal or downlink channel is located is determined; the mapping table corresponding to the CORESET group is determined; and the reference signal is determined according to a QCL reference signal included in TCI states corresponding to L predetermined TCI codepoints in the mapping table, where L is a positive integer greater than or equal to 1.

It should be noted that acquiring information 2 according to information 1 in the present disclosure involves one of the following cases that acquisition parameters of the information 2 include the information 1; the information 2 includes the information 1; and the information 2 is the information 1.

In some exemplary implementations, N CORESET groups correspond to N mapping tables; and one CORESET group corresponds to one mapping table.

The L predetermined TCI codepoints include one of the following: L lowest TCI codepoints; L lowest TCI codepoints in a codepoint set, wherein the number of TCI states of each codepoint in the codepoint set is greater than a preset value; and L lowest TCI codepoints in a codepoint set, wherein the number of TCI states of each codepoint in the codepoint set is less than or equal to a preset value; and the reference signal is acquired according to B TCI states corresponding to a predetermined TCI codepoint, where the predetermined TCI codepoint corresponds to A TCI states, where A is a positive integer greater than or equal to 1, and B is a positive integer less than or equal to A, where the predetermined TCI codepoint belongs to the L predetermined TCI codepoints, and the B TCI states belong to the A TCI states.

The N CORESET groups are located in a frequency domain bandwidth, and data channels corresponding to the N mapping tables are located in one frequency domain bandwidth; and L is a positive integer greater than or equal to 1.

In some exemplary implementations, second information is associated with third information.

The second information includes one of the following: the number of port groups included in the downlink signal; the maximum number of port groups included in the downlink signal; the maximum number of data channels received on a same time domain symbol in one frequency domain bandwidth; the number of channels received on a same time domain symbol in one frequency domain bandwidth; or the number of channel scrambling parameters configured in one frequency domain bandwidth.

The third information includes at least one of a B value and an L value, where the B value is less than the number of the port groups or the maximum number of the port groups.

One port group corresponds to one TCI state, and different port groups correspond to different TCI states.

In some exemplary implementations, the operation that the reference signal is determined according to the mapping table between the TCI codepoint and the TCI state includes the following operation that the reference signal is determined according to a QCL reference signal included in TCI states corresponding to P predetermined TCI codepoints in the mapping table, where P is a positive integer greater than or equal to 1.

In some exemplary implementations, P predetermined TCI codepoints include one of the following: P lowest TCI codepoints; P lowest TCI codepoints in a codepoint set, wherein the number of TCI states of each codepoint in the codepoint set is greater than a preset value; P lowest TCI codepoints in a codepoint set, wherein the number of TCI states of each codepoint in the codepoint set is less than or equal to a preset value; P TCI codepoints with equal intervals in a mapping table; P TCI codepoints with equal intervals in a codepoint set, wherein the number of TCI states of each codepoint in the codepoint set is greater than a preset value; P TCI codepoints with equal intervals in a codepoint set, wherein the number of TCI states of each codepoint in the codepoint set is less than or equal to a preset value; or P TCI codepoints corresponding to P CORESET groups included in a frequency domain bandwidth for scheduling the downlink signal or downlink channel.

In some exemplary implementations, the reference signal is acquired according to B TCI states corresponding to a predetermined TCI codepoint, where the predetermined TCI codepoint corresponds to A TCI states, where A is a positive integer greater than or equal to 1, and B is a positive integer less than or equal to A, where the predetermined TCI codepoint belongs to the P predetermined TCI codepoints, and the B TCI states belong to the A TCI states.

In some exemplary implementations, fourth information is associated with fifth information, where the fourth information includes at least one of the following: the number of CORESET groups included in a frequency domain bandwidth for scheduling the downlink signal or downlink channel; the number of port groups included in the downlink signal; the maximum number of port groups included in the downlink signal; the maximum number of data channels received on a same time domain symbol in one frequency domain bandwidth; the number of channels received on a same time domain symbol in one frequency domain bandwidth; or the number of channel scrambling parameters configured in one frequency domain bandwidth.

One port group corresponds to one TCI state, and different port groups correspond to different TCI states.

The fifth information includes at least one of the P value and the B value. The B value is less than the number of the port groups or the maximum number of the port groups.

In some exemplary implementations, in a case where P is greater than 1, at least one of the following features is satisfied: there is only one mapping table in a frequency domain bandwidth where the downlink signal or downlink channel is located; the number of CORESET groups included in a frequency domain bandwidth where a control channel for scheduling the downlink signal or downlink channel is located is greater than 1; multiple CORESET groups correspond to one mapping table; and the maximum number of TCI states corresponding to each TCI codepoint in the mapping table is less than a preset value.

In some exemplary implementations, the operation that the reference signal is determined according to the relation between the carrier where the control channel for scheduling the downlink signal or downlink channel is located and the carrier where the downlink signal or downlink channel is located includes the following operations that the reference signal is acquired according to first-type parameters in a case where the carrier where the control channel for scheduling the downlink signal or downlink channel is located is different from the carrier where the downlink signal or downlink channel is located; and the reference signal is acquired according to second-type parameters in a case where the carrier where the control channel for scheduling the downlink signal or downlink channel is located is the same as the carrier where the downlink signal or downlink channel is located.

The first-type parameters satisfy at least one of the following features: a difference set of the first-type parameters and the second-type parameters is non-empty; the difference set of the first-type parameters and the second-type parameters includes: the mapping table; and an activated TCI state set; and whether the difference set is empty is determined according to the number of port groups included in the downlink signal.

In some exemplary implementations, the operation that the reference signal is determined according to the type of the downlink signal and the relation between the carrier where the control channel for scheduling the downlink signal or downlink channel is located and the carrier where the downlink signal or downlink channel is located includes at least one of the following operations that in a case where the downlink signal includes an aperiodic measurement reference signal, and a carrier where the downlink aperiodic measurement reference signal is located is different from a carrier where a control channel for scheduling the aperiodic measurement reference signal is located, acquisition parameters of the reference signal comprise a QCL reference signal of CORESET that satisfies a predetermined feature and is included in a time unit latest to the downlink aperiodic measurement reference signal in the carrier where the downlink aperiodic measurement reference signal is located; and in a case where the downlink signal includes a demodulation reference signal of a downlink data channel, and a carrier where the downlink data channel is located is different from a carrier where a control channel for scheduling the downlink data channel is located, the acquisition parameters of the reference signal do not comprise a QCL reference signal of CORESET that satisfies a predetermined feature and is included in a time unit latest to the downlink data channel in a carrier where the demodulation reference signal of the downlink data channel is located.

It should be noted that the carrier and the serving cell in the present disclosure are equivalent.

In some exemplary implementations, the reference signal corresponding to a first port group of the downlink signal or downlink channel is determined according to the first information; and the reference signal corresponding to a second port group of the downlink signal or downlink channel is determined according to second information.

The second information is included in at least one of a radio resource control (RRC) signal and a medium access control-control element (MAC-CE) signal.

In some exemplary implementations, the mapping table between the TCI codepoint and the TCI state is a mapping table activated for a downlink data channel in a frequency domain bandwidth where the downlink signal or downlink channel is located.

In some exemplary implementations, the reference signal includes a QCL reference signal of a first QCL type associated with CORESET with a minimum CORESET identifier in a latest first-type slot, the downlink signal or downlink channel includes a downlink signal or downlink channel of a first-type component carrier (CC) or bandwidth part (BWP), the first-type CC or BWP belongs to a first-type CC or BWP set, and the first-type CC or BWP set belongs to a CC or BWP group.

In some exemplary implementations, an index of a first-type slot is determined according to a numerology parameter of a CC or BWP in the first-type CC or BWP set.

In some exemplary implementations, the reference signal includes a QCL reference signal of a first QCL type associated with an activated TCI state that is applied to a downlink signal or downlink channel of a second-type CC or BWP and has a minimum TCI state identifier, the downlink signal or downlink channel includes a downlink signal or downlink channel of a first-type CC or BWP, the first-type CC or BWP and the second-type CC or BWP belong to a first-type CC or BWP set, and the first-type CC or BWP set belongs to a CC or BWP group.

In some exemplary implementations, an index of the second-type CC or BWP is determined according to a numerology parameter of a CC or BWP in the first-type CC or BWP set.

In some exemplary implementations, in the case where the preset condition is satisfied, a first communication node preferentially receives a downlink signal or downlink channel of a third-type CC or BWP, the third-type CC or BWP belongs to a first-type CC or BWP set, and the first-type CC or BWP set belongs to a CC or BWP group.

In some exemplary implementations, an index of the third-type CC or BWP is determined according to a neurology parameter of a CC in the first-type CC or BWP set.

In some exemplary implementations, the first-type CC or BWP set satisfies at least one of the following features: a time interval between any downlink signal or channel in the first-type CC or BWP set and a control channel for scheduling the downlink signal or downlink channel is less than a preset threshold; and all downlink signals or channels in the first-type CC or BWP set conflict with each other.

In some exemplary implementations, the reference signal includes a QCL reference signal of a first QCL type associated with a first-type CORESET in a latest slot.

In some exemplary implementations, the first-type CORESET is determined according to at least one of the following features: a search space associated with the first-type CORESET occupies the maximum number of symbols; the search space associated with the first-type CORESET occupies the maximum span of symbols; and the first-type CORESET has a minimum CORESET identifier.

In some exemplary implementations, the number of demodulation reference signal (DM-RS) port groups associated with the downlink signal or downlink channel is less than or equal to L, and L is an integer greater than or equal to 1. In some exemplary implementations, L is less than or equal to the number of TCI states corresponding to a first TCI codepoint.

In some exemplary implementations, the preset condition includes at least one of the following conditions: a time interval between the downlink signal or downlink channel and a control channel for scheduling the downlink signal or downlink channel is less than a preset threshold; the downlink signal or downlink channel and the control channel for scheduling the downlink signal or downlink channel are in different carriers; the control channel for scheduling the downlink signal or downlink channel does not include a TCI indication domain; the number of port groups included in the downlink signal is greater than a preset value; the number of CORESET groups included in a frequency domain bandwidth where the control channel for scheduling the downlink signal or downlink channel is located is greater than a preset value; at least one of TCI states configured or activated in the frequency domain bandwidth where the downlink signal or downlink channel is located includes a QCL reference signal associated with a spatial reception parameter; the number of channel scrambling parameters configured in one frequency domain bandwidth is greater than a preset value; and a QCL reference signal of a first QCL type associated with the downlink signal or downlink channel is different from a QCL reference signal of a first QCL type associated with a first-type CORESET.

In some exemplary implementations, the operation that information of a downlink signal or downlink channel is determined according to the reference signal includes at least one of the following operations that a QCL reference signal of the downlink signal or downlink channel is determined according to the reference signal; a QCL assumption of the downlink signal or downlink channel is determined according to the reference signal; a QCL reference signal, associated with a first-type QCL assumption, of the downlink signal or downlink channel is determined according to the reference signal; and a first-type QCL assumption of the downlink signal or downlink channel is determined according to the reference signal.

In some exemplary implementations, the operation that information of a downlink signal or downlink channel is determined according to the reference signal includes at least one of the following operations: a second-type QCL assumption of the downlink signal or downlink channel is acquired according to TCI information indicated in a control channel for scheduling the downlink signal or downlink channel; and in a case where an intersection set of time domain resources occupied by two downlink signals or channels is non-empty, the two downlink signals or channels correspond to a same first-type QCL assumption and each of the two downlink signals or channels corresponds to one second-type QCL assumption, where the first-type QCL assumption includes a spatial reception parameter assumption; and the second QCL assumption does not include a spatial reception parameter assumption.

In some exemplary implementations, the operation that information of a downlink signal or downlink channel is determined according to the reference signal includes the following operation: a resource element (RE) on a first-type symbol in a latest slot is unavailable for the downlink signal or downlink channel in the case where the preset condition is satisfied.

In some exemplary implementations, the first-type symbol is determined according to at least one of the following features: the downlink signal or downlink channel conflicts with a control channel on the first-type symbol; the downlink signal or downlink channel conflicts with a channel state information reference signal (CSI-RS) on the first-type symbol; a QCL reference signal of a first QCL type associated with the downlink signal or downlink channel is different from a QCL reference signal of a first QCL type associated with a control channel on the first-type symbol; and a QCL reference signal of a first QCL type associated with the downlink signal or downlink channel is different from a QCL reference signal of a first QCL type associated with a CSI-RS on the first-type symbol.

In some exemplary implementations, the preset condition in the embodiment includes: a time interval between the downlink signal or downlink channel and a downlink physical control channel for scheduling the downlink signal or downlink channel is less than a preset threshold.

The present disclosure will be illustrated by combining the exemplary embodiments of the embodiment.

It should be noted that the first communication node in the embodiment refers to user equipment (UE); and a second communication node refers to a base station (gNodeB).

A mode of determining information 2 according to information 1 satisfies at least one of the following conditions that acquisition parameters of the information 2 include the information 1; the information 2 includes the information 1; and the information 2 is the information 1.

A relation between two pieces of information comprises at least one of the cases: the other piece of information is acquired according to one piece of information; and a value range of one piece of information depends on a value range of the other piece of information.

The downlink signal or downlink channel includes a physical downlink shared channel (PDSCH).

The first quasi co-located (QCL) type includes QCL-Type D or QCL-Type A, where the QCL-Type D refers to a received spatial filter or reception beam, and the QCL-Type A refers to Doppler shift, Doppler spread, average delay and delay spread.

The QCL assumption refers to QCL parameters or large-scale channel parameters, which include the received spatial filter or reception beam, the Doppler shift, the Doppler spread, the average delay and the delay spread.

The QCL reference signal of the downlink signal or downlink channel means that downlink signal or channel has consistent large-scale channel parameters with the QCL reference signal, for example, a "QCL reference signal of a PDSCH" means that the PDSCH or PDSCH DM-RS has consistent large-scale parameters with the QCL reference signal.

Frequency domain bandwidth refers to CC, or BWP, or a continuous physical resource block group (PRG) set. In addition, the "carrier" is equivalent to a serving cell.

The control channel includes a physical downlink control channel (PDCCH).

The data channel includes PDSCH.

Types of the downlink signal include an aperiodic type, a periodic type and a semi-persistent type.

The port groups include a port group of the PDSCH DM-RS.

"Latest" means that a time domain is latest to the downlink signal or downlink channel.

The "time interval" in "a time interval between the downlink signal or downlink channel and a control channel for scheduling the downlink signal or downlink channel is less than a preset threshold" refers to a time domain distance between a first time domain symbol occupied by a resource of the downlink signal or downlink channel and a last time domain symbol occupied by a resource of the control channel for scheduling the downlink signal or downlink channel, which may also be called scheduling offset.

Exemplary Embodiment 1

A specific serving cell is provided with 2 CORESET groups: CORESET group 1 and CORESET group 2, where the CORESET group 1 includes a CORESET: CORESET 1, and downlink control information (DCI) 1 (or PDCCH 1) located on the CORESET 1 schedules a PDSCH: PDSCH 1; and the CORESET group 2 includes a CORESET: CORESET 2, and DCI 2 (or PDCCH 2) located on the CORESET 2 schedules a PDSCH: PDSCH 2, that is, the PDSCH 1 corresponds to the CORESET group 1, and the PDSCH 2 corresponds to the CORESET group 2. In addition, the serving cell activates, by means of activation commands (i.e. an MAC-CE signaling), 2 TCI state sets: TCI state set 1 and TCI state set 2, where the CORESET 1 corresponds to the TCI state set 1 activated by the MAC-CE signaling, and the CORESET 2 corresponds to the TCI state set 2 activated by the MAC-CE signaling, that is, the CORESET 1 is associated with the TCI state set 1, and the CORESET 2 is associated with the TCI state set 2. Table 1 and Table 2 are mapping tables between TCI codepoints corresponding to the CORESET group 1 and the CORESET group 2 and TCI states in the TCI state sets 1 and 2, respectively, from which a relation between each TCI codepoint and the corresponding TCI state may be determined. Assuming that a time interval between the PDSCH 1 and the PDCCH 1 for scheduling the PDSCH 1 is less than a preset threshold and a time interval between the PDSCH 2 and the PDCCH 2 for scheduling the PDSCH 2 is less than a preset threshold, the UE may determine the QCL reference signal of the PDSCH according to the CORESET group corresponding to the PDSCH and the QCL reference signal of the first QCL type associated with B TCI states corresponding to L predetermined TCI codepoints. L may be a positive integer greater than or equal to 1, B is less than or equal to A, and A refers to the number of TCI states corresponding to L predetermined items.

In some exemplary implementations, the L predetermined items may be L lowest TCI codepoints, or L lowest TCI codepoints in a codepoint set, wherein the number of TCI states of each codepoint in the codepoint set is greater than a preset value, or L lowest TCI codepoints in a codepoint set, wherein the number of TCI states of each codepoint in the codepoint set is less than or equal to a preset value. Assuming L lowest items herein, the UE may acquire a QCL assumption of the PDSCH 1 according to TCI state 18 corresponding to a first TCI codepoint of the mapping table (Table 1) corresponding to the CORESET group 1, and the UE may acquire a QCL assumption of the PDSCH 2 according to TCI state 20 corresponding to the first TCI codepoint of the mapping table (table 2) corresponding to the CORESET group 2, where B=1 and A=1.

TABLE 1

Table 1: Mapping table between TCI codepoints corresponding to CORESET group 1 and TCI states in TCI state set 1

| Values of TCI codepoints in DCI | TCI states activated by MAC-CE |
|---|---|
| 000 | TCI state18 |
| 001 | TCI state3, TCI state4 |
| 010 | TCI state5 |
| 011 | TCI state6 |
| 100 | TCI state7 |
| 101 | TCI state23, TCI state58 |
| 110 | TCI state44 |
| 111 | TCI state127 |

TABLE 2

Table 2: Mapping table between TCI codepoints corresponding to CORESET group 2 and TCI states in TCI state set 2

| Values of TCI codepoints in DCI | TCI states activated by MAC-CE |
|---|---|
| 000 | TCI state20 |
| 001 | TCI state1, TCI state2 |
| 010 | TCI state4 |
| 011 | TCI state5 |
| 100 | TCI state6, TCI state58 |
| 101 | TCI state7 |
| 110 | TCI state50 |
| 111 | TCI state125 |

Exemplary Embodiment 2

A specific serving cell schedules two PDSCHs: PDSCH 1 and PDSCH 2 through DCI (or PDCCH), the serving cell activates, by means of activation commands (i.e. an MAC-CE signaling), 1 TCI state set, and Table 3 is a mapping table between TCI codepoints and TCI states in the TCI state set, from which a relation between each TCI codepoint and the corresponding TCI state may be determined. Assuming that a time interval between the PDSCH 1 and PDCCH 1 for scheduling the PDSCH 1 is less than a preset threshold and a time interval between the PDSCH 2 and PDCCH 2 for scheduling the PDSCH 2 is less than a preset threshold, the UE may determine the QCL reference signal of the PDSCH according to a CORESET group corresponding to the PDSCH and the QCL reference signal of the first QCL type associated with B TCI states corresponding to P predetermined TCI codepoints. L may be a positive integer greater than or equal to 1, B is less than or equal to A, and A refers to the number of TCI states corresponding to P predetermined items.

In some exemplary implementations, the P predetermined items may be P lowest TCI codepoints, or P lowest TCI codepoints in a codepoint set, wherein the number of TCI states of each codepoint in the codepoint set is greater than a preset value, or P lowest TCI codepoints in a codepoint set, wherein the number of TCI states of each codepoint in the codepoint set is less than or equal to a preset value. Assuming 1 lowest TCI codepoint in a codepoint set, the number of TCI states corresponding the codepoint set being greater than 1 herein, which is a second TCI codepoint: "001", the UE may determine a QCL assumption of PDSCH 1 according to TCI state 3 and determine a QCL assumption of PDSCH 2 according to TCI state 4, where B=1 and A=2.

TABLE 3

Table 3: Mapping table between TCI codepoints and TCI states in a TCI state set

| Values of TCI codepoints in DCI | TCI states activated by MAC-CE |
|---|---|
| 000 | TCI state18 |
| 001 | TCI state3, TCI state4 |
| 010 | TCI state5 |
| 011 | TCI state6 |
| 100 | TCI state7 |
| 101 | TCI state23, TCI state58 |
| 110 | TCI state44 |
| 111 | TCI state127 |

Exemplary Embodiment 3

In a case where two PDSCHs and/or aperiodic (AP)-CSI-RSs scheduled by two transmit-receive points (TRP) both have scheduling delays less than a preset value, the two PDSCHs and/or AP-CSI-RSs correspond to the same spatial reception parameter assumption (i.e. the first-type QCL assumption), and other QCL assumptions (i.e. the second-type QCL assumptions) of the two PDSCHs/AP-CSI-RSs are acquired according to a TCI domain indicated in the PDCCH for scheduling the two PDSCHs/AP-CSI-RSs.

Exemplary Embodiment 4

In a case where a first preset condition is satisfied, the reference signal is determined according to a QCL reference signal of a first QCL type associated with a CORESET with a minimum CORESET identifier (ID) on a latest first slot; and A QCL assumption of a PDSCH of the first-type CC is determined according to the reference signal, where the first-type CC belongs to the first-type CC set, and the first-type CC set belongs to the CC group.

In some exemplary implementations, the first preset condition includes at least one of the following:

- a time interval between a PDSCH of any CC in the first-type CC set and a PDCCH for scheduling the PDSCH is less than a preset threshold; and
- PDSCHs of all CCs in the first-type CC set conflict, specifically, "conflict" refers to overlapping of time domain resource positions occupied by PDSCHs of all CCs in the first-type CC set ("conflict" will not be introduced again in the following embodiments).

In some exemplary implementations, determination of the first-type slot depends on numerology of CCs in the first-type CC set, and specifically, numerology includes subcarrier spacing.

Figure 3:
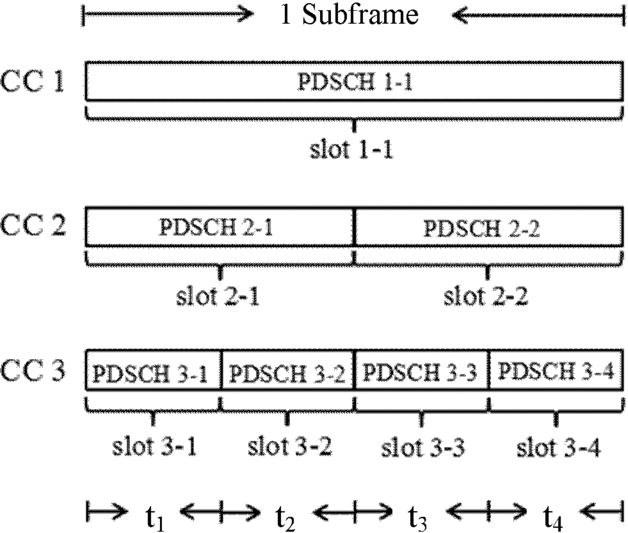
FIG. 3 is a schematic diagram I of a CC group according to the embodiments of the present disclosure.
Figures 4, 5:
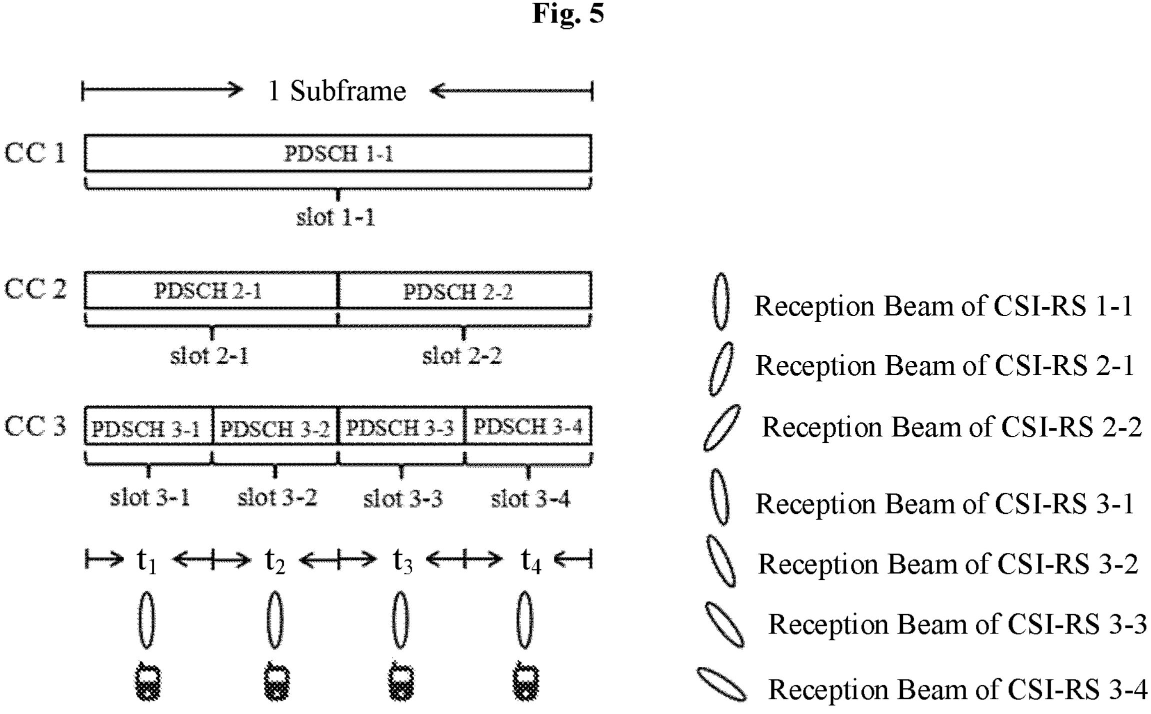
FIG. 4 is a schematic diagram II of a CC group according to the embodiments of the present disclosure.
FIG. 5 is a schematic diagram III of a CC group according to the embodiments of the present disclosure.

As shown in FIG. 3, the CC group includes CC 1, CC 2 and CC 3, where subcarrier spacing of the CC 1, subcarrier spacing of the CC 2 and subcarrier spacing of the CC 3 are 15 kHz, 30 kHz and 60 kHz respectively, so 3 CCs have different numbers of slots in 1 specific subframe, specifically, the CC 1 has 1 slot: slot 1-1 in the specific subframe; the CC 2 has 2 slots: slot 2-1 and slot 2-2 in the specific subframe; and the CC 3 has 4 slots: slot 3-1, slot 3-2, slot 3-3 and slot 3-4 in the specific subframe, where PDSCH 1-1 is transmitted on the slot 1-1, PDSCH 2-1 and PDSCH 2-2 are transmitted on the slot 2-1 and slot 2-2 respectively, and PDSCH 3-1, PDSCH 3-2, PDSCH 3-3 and PDSCH 3-4 are transmitted on the slot 3-1, slot 3-2, slot 3-3 and slot 3-4 respectively. In addition, QCL reference signals of first QCL types (i.e. QCL-Type D) associated with CORESETs with minimum CORESET IDs on the slot 1-1, slot 2-1, slot 2-2, slot 3-1, slot 3-2, slot 3-3 and slot 3-4 are CSI-RS 1-1, CSI-RS 2-1, CSI-RS 2-2, CSI-RS 3-1, CSI-RS 3-2, CSI-RS 3-3 and CSI-RS 3-4 respectively. Assuming that a time interval between the PDSCH and the PDCCH for scheduling the PDSCH is less than a preset threshold, and PDSCHs of the CC 1, CC 2 and CC 3 conflict in time periods of t1, t2, t3 and t4, that is, the first-type CC set includes the CC 1, CC 2 and CC 3, where the CC 1, CC 2 and CC 3 are the first-type CCs respectively, the UE may determine the reference signal according to the QCL reference signal of the QCL-Type D associated with the CORESET with the minimum CORESET ID on the latest first-type slot, where determination of a first slot depends on numerology of CCs in the first-type CC set (which may be the subcarrier spacing). For example, the first slot is determined according to maximum subcarrier spacing (CC 3, 60 kHz), that is, in the t1, a first-type slot latest to the PDSCH 1-1, PDSCH 2-1 and PDSCH 3-1 is the slot 3-1, thus determining the reference signal to be the CSI-RS 3-1; in the t2, a first-type slot latest to the PDSCH 1-1, PDSCH 2-1 and PDSCH 3-2 is the slot 3-2, thus determining the reference signal to be the CSI-RS 3-2; in the t3, a first-type slot latest to the PDSCH 1-1, PDSCH 2-2 and PDSCH 3-3 is the slot 3-3, thus determining the reference signal to be the CSI-RS 3-3; and in the t4, a first-type slot latest to the PDSCH 1-1, PDSCH 2-2 and PDSCH 3-4 is the slot 3-4, thus determining the reference signal to be the CSI-RS 3-4, so that in the t1, QCL assumptions of the PDSCH 1-1, PDSCH 2-1 and PDSCH 3-1 may be determined according to the CSI-RS 3-1, that is, the PDSCH 1-1, PDSCH 2-1 and PDSCH 3-1 have consistent reception beams with the CSI-RS 3-1, similarly, in the t2, the PDSCH 1-1, PDSCH 2-1 and PDSCH 3-2 have consistent reception beams with the CSI-RS 3-2; in the t3, the PDSCH 1-1, PDSCH 2-2 and PDSCH 3-3 have consistent reception beams with the CSI-RS 3-3; and in the t4, the PDSCH 1-1, PDSCH 2-2 and PDSCH 3-4 have consistent reception beams with the CSI-RS 3-4. Determined beams of PDSCH in the t1, t2, t3 and t4 are shown in FIG. 4.

In some exemplary implementations, the first slot may also be determined according to minimum subcarrier spacing (CC 1, 15 kHz), that is, in the t1, t2, t3 and t4, a first-type slot latest to the PDSCH 1-1, PDSCH 2-1, PDSCH 3-1, PDSCH 3-2, PDSCH 3-3 and PDSCH 3-4 is the slot 1-1, so the reference signal may be determined to be the CSI-RS 1-1. Therefore, in the t1, t2, t3 and t4, the PDSCH 1-1, PDSCH 2-1, PDSCH 3-1, PDSCH 3-2, PDSCH 3-3 and PDSCH 3-4 have consistent reception beams with the CSI-RS 1-1. Determined beams of a PDSCH in the t1, t2, t3 and t4 are shown in FIG. 5.

Exemplary Embodiment 5

In a case where a first preset condition is satisfied, the reference signal is determined according to a QCL reference signal of a first QCL type associated with an activated TCI state that is applied to a PDSCH of a first-type CC and has a minimum TCI state identifier; and A QCL assumption of a PDSCH of the first-type CC is determined according to the reference signal, where the first-type CC belongs to the first-type CC set, and the first-type CC set belongs to a CC group.

In some exemplary implementations, the first preset condition includes at least one of the following:

- a time interval between a PDSCH of any CC in the first-type CC set and a PDCCH for scheduling the PDSCH is less than a preset threshold; and
- PDSCHs of all CCs in the first-type CC set conflict.

For example, the CC group includes CC 1, CC 2 and CC 3, where DCI located on a CORESET (or PDCCH) of CC 1 is configured to schedule a PDSCH transmitted on the CC 1, CC 2 and CC 3; a base station activates TCI state set 1, TCI state set 2 and TCI state set 3 on the CC 1, CC 2 and CC 3 through activation commands (i.e. an MAC-CE signaling) respectively, which are applied to PDSCHs on the CC 1, CC 2 and CC 3 respectively; and then QCL reference signals of QCL-Type A associated with TCI states (or first TCI states) with minimum TCI state identifiers in the TCI state set 1, TCI state set 2 and TCI state set 3 are the CSI-RS 1, CSI-RS 2 and CSI-RS 3 respectively. Assuming that a time interval between the PDSCHs of the CC 1, CC 2 and CC 3 and a PDCCH for scheduling the PDSCHs is less than a preset threshold, and the PDSCHs on the CC 1, CC 2 and CC 3 conflict in time domain, that is, the first-type CC set includes the CC 1, CC 2 and CC 3, where the CC 1, CC 2 and CC 3 are first-type CCs respectively, the UE may determine the reference signal according to the QCL reference signal (that is, CSI-RS 1) of QCL-Type A associated with a TCI state that is applied to the PDSCH of the CC 1 and has a minimum TCI state identifier. Therefore, a QCL assumption of the PDSCH of the CC 1 may be determined according to the CSI-RS 1, that is, the PDSCH of the CC 1 has consistent Doppler shift, Doppler spread, average delay and delay spread with the CSI-RS 1, similarly, the PDSCH of the CC 2 has consistent Doppler shift, Doppler spread, average delay and delay spread with the CSI-RS 2, and the PDSCH of the CC 3 has consistent Doppler shift, Doppler spread, average delay and delay spread with the CSI-RS 3.

Exemplary Embodiment 6

In some exemplary implementations, in the case where the preset condition is satisfied, the UE preferentially receives a PDSCH of a second-type CC, the second-type CC belongs to a second-type CC set, and the second-type CC set belongs to a CC group.

In some exemplary implementations, the preset condition includes at least one of the following:

- a time interval between a PDSCH of any CC in the second-type CC set and a PDCCH for scheduling the PDSCH is less than a preset threshold; and
- PDSCHs of all CCs in the second-type CC set conflict.

In some exemplary implementations, determination of an index value of the second-type CC depends on numerology of CCs in the second-type CC set, specifically, the numerology may include: an index value of a CC and subcarrier spacing.

For example, as shown in FIG. 3, the CC group includes CC 1, CC 2 and CC 3, where subcarrier spacing of the CC 1, subcarrier spacing of the CC 2 and subcarrier spacing of the CC 3 are 15 kHz, 30 kHz and 60 kHz respectively, so 3 CCs have different numbers of slots in 1 specific subframe, specifically, the CC 1 has 1 slot: slot 1-1 in the specific subframe; the CC 2 has 2 slots: slot 2-1 and slot 2-2 in the specific subframe; and the CC 3 has 4 slots: slot 3-1, slot 3-2, slot 3-3 and slot 3-4 in the specific subframe, where PDSCH 1-1 is transmitted on the slot 1-1, PDSCH 2-1 and PDSCH 2-2 are transmitted on the slot 2-1 and slot 2-2 respectively, and PDSCH 3-1, PDSCH 3-2, PDSCH 3-3 and PDSCH 3-4 are transmitted on the slot 3-1, slot 3-2, slot 3-3 and slot 3-4 respectively. Assuming that a time interval (or scheduling offset) between the PDSCH and the PDCCH for scheduling the PDSCH is less than a preset threshold, and PDSCHs of the CC 1, CC 2 and CC 3 conflict in time periods of t1, t2, t3 and t4, that is, the second-type CC set includes the CC 1, CC 2 and CC 3, where the CC 1, CC 2 and CC 3 are the second-type CCs respectively, the UE preferentially receives a PDSCH of the second-type CC in the t1, t2, t3 and t4, where the determination of the index value of the second-type CC depends on the numerology of CCs in the second-type CC set. For example, the index value of the second-type CC is determined according to an index value of a maximum CC, which is CC 3, so the UE preferentially receives the PDSCH 3-1 in the t1, the UE preferentially receives the PDSCH 3-2 in the t2, the UE preferentially receives the PDSCH 3-3 in the t3, and the UE preferentially receives the PDSCH 3-4 in the t4. In some exemplary implementations, the index value of the second-type CC may also be determined according to an index value of a minimum CC, which is CC 1, so the UE preferentially receives the PDSCH 1-1 in the t1, t2, t3 and t4. In some exemplary implementations, the index value of the second-type CC may also be determined according to maximum subcarrier spacing (CC 3, 60 kHz), which is CC 3, so the UE preferentially receives the PDSCH 3-1 in the t1, the UE preferentially receives the PDSCH 3-2 in the t2, the UE preferentially receives the PDSCH 3-3 in the t3, and the UE preferentially receives the PDSCH 3-4 in the t4. In some exemplary implementations, the index value of the second-type CC may also be determined according to minimum subcarrier spacing (CC 1, 15 kHz), which is CC 1, so the UE preferentially receives the PDSCH 1-1 in the t1, t2, t3 and t4.

Exemplary Embodiment 7

In the case where the preset condition is satisfied, the reference signal is determined according to a QCL reference signal of a first QCL type associated with a first-type CORESET on a latest slot; and a QCL assumption of a PDSCH is determined according to the reference signal.

In some exemplary implementations, the preset condition includes:

a time interval between a PDSCH and a PDCCH for scheduling the PDSCH is less than a preset threshold.

In some exemplary implementations, the first-type CORESET satisfies at least one of the following features:

a search space associated with the first-type CORESET occupies the maximum number of symbols;

the search space associated with the first-type CORESET occupies the maximum span of symbols; and the first-type CORESET has a minimum CORESET ID.

For example, for a slot n, the slot includes 14 (time domain) symbols with symbol indexes of 0 to 13. In addition, the slot has 3 CORESETs: CORESET 0, CORESET 1 and CORESET 2, where the CORESET 0 is located on symbol 0; the CORESET 1 is located on symbols 2 and 4; and the CORESET 2 is located on symbols 6, 8, 10 and 12. QCL reference signals of QCL-Type D associated with the CORESET 0, CORESET 1 and CORESET 2 are CSI-RS 1, CSI-RS 2 and CSI-RS 3 respectively. Assuming that the PDSCH is located in all symbols on the slot n, and the time interval between the PDSCH and the PDCCH for scheduling the PDSCH is less than a preset threshold, the UE may determine the reference signal according to the QCL reference signal of QCL-Type D associated with the first-type CORESET on the latest slot (which is the slot n).

In some exemplary implementations, the first-type CORESET may satisfy the feature that the search space associated with the first-type CORESET occupies the maximum number of symbols, which is CORESET 2, so that the UE may determine the reference signal according to a QCL reference signal (which is the CSI-RS 3) of QCL-Type D associated with the CORESET 2, and then a reception beam of a PDSCH may be determined according to the CSI-RS 3. On symbols 0, 2 and 4, according to a conventional PDSCH QCL assumption determination method, the UE may preferentially receive the CORESET 0 by means of the reception beam of the CSI-RS 1 on the symbol 0 and preferentially receive the CORESET 1 by means of the reception beam of the CSI-RS 2 on the symbols 2 and 4. A schematic diagram of determined reception beams of a PDSCH is shown in FIG. 6.

Figure 6:
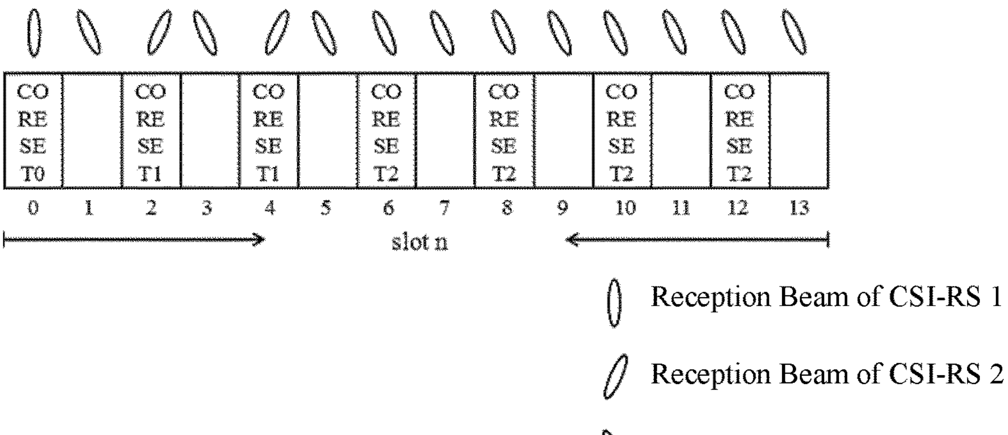
FIG. 6 is a schematic diagram I of a reception beam of the PDSCH according to the embodiments of the present disclosure.
Figure 7:
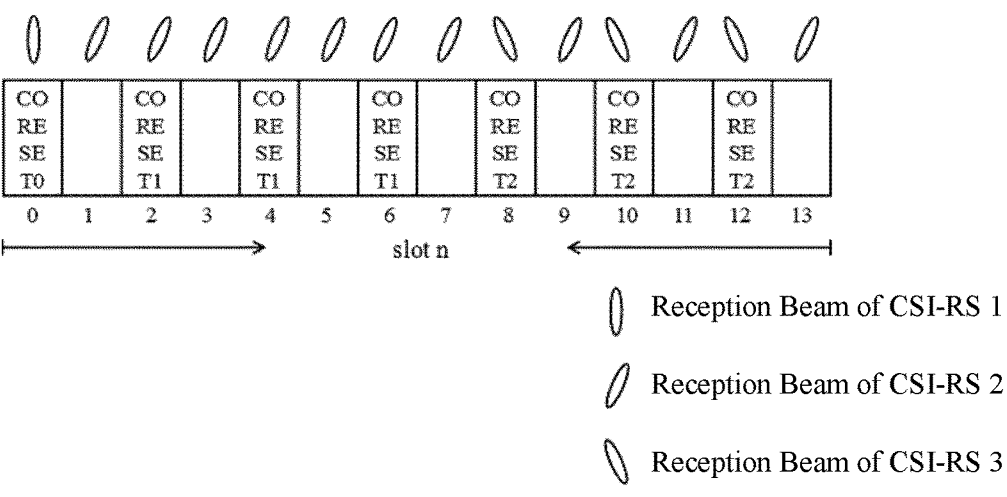
FIG. 7 is a schematic diagram II of the reception beam of the PDSCH according to the embodiments of the present disclosure.

In some exemplary implementations, the first-type CORESET may also satisfy the features that the search space associated with the first-type CORESET occupies the maximum number of symbols and the first-type CORESET has a minimum CORESET ID, which is different from the embodiment shown in FIG. 6 in that CORESET 1 is located on the symbols 2, 4 and 6 and CORESET 2 is located on the symbols 8, 10 and 12. In this case, the UE may determine the reference signal according to a QCL reference signal (which is the CSI-RS 2) of QCL-Type D associated with the CORESET 1, and then a reception beam of a PDSCH may be determined according to the CSI-RS 2. On the symbols 0, 8, 10 and 12, according to a conventional PDSCH QCL assumption determination method, the UE may preferentially receive the CORESET 0 by means of the reception beam of the CSI-RS 1 on the symbol 0 and preferentially receive the CORESET 2 by means of the reception beam of the CSI-RS 3 on the symbols 8, 10 and 12. A schematic diagram of determined reception beams of a PDSCH is shown in FIG. 7.

Figure 8:
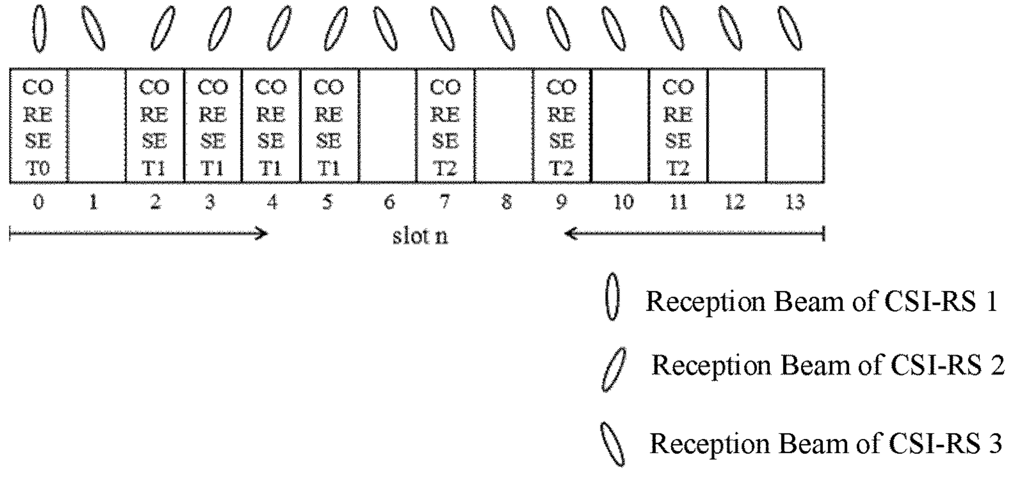
FIG. 8 is a schematic diagram III of the reception beam of the PDSCH according to the embodiments of the present disclosure.

In some exemplary implementations, the first-type CORESET may also satisfy the feature that the search space associated with the first-type CORESET occupies the maximum span of symbols, which is different from the embodiment shown in FIG. 6 in that CORESET 1 is located on the symbols 2, 3, 4 and 5 and CORESET 2 is located on the symbols 7, 9 and 11. Symbol spans occupied by the search spaces associated with the CORESET 1 and CORESET 2 are 4 (symbols) and 5 (symbols), respectively. In this case, the UE may determine the reference signal according to a QCL reference signal (which is the CSI-RS 3) of QCL-Type D associated with the CORESET 2, and then the UE may determine a reception beam of a PDSCH according to the CSI-RS 3. On symbols 0, 2, 3, 4 and 5, according to a conventional PDSCH QCL assumption determination method, the UE may preferentially receive the CORESET 0 by means of the reception beam of the CSI-RS 1 on the symbol 0 and preferentially receive the CORESET 1 by means of the reception beam of the CSI-RS 2 on the symbols 2, 3, 4 and 5. A schematic diagram of determined reception beams of a PDSCH is shown in FIG. 8.

Figure 9:
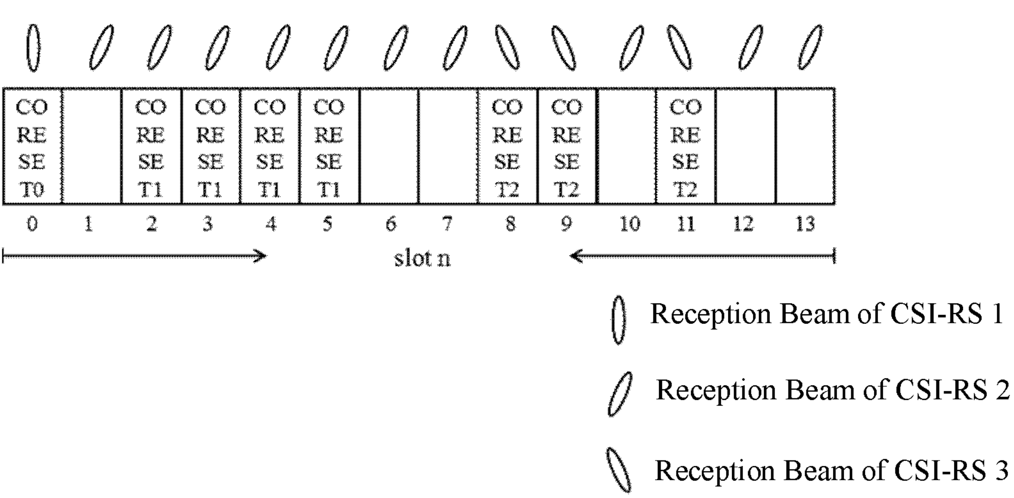
FIG. 9 is a schematic diagram IV of the reception beam of the PDSCH according to the embodiments of the present disclosure.

In some exemplary implementations, the first-type CORESET may also satisfy the features that the search space associated with the first-type CORESET occupies the maximum number of symbols and the first-type CORESET has a minimum CORESET ID, which is different from the embodiment shown in FIG. 6 in that CORESET 1 is located on the symbols 2, 3, 4 and 5 and CORESET 2 is located on the symbols 8, 9 and 11. Symbol spans occupied by the search spaces associated with the CORESET 1 and CORESET 2 both are 4 (symbols). In this case, the UE may determine the reference signal according to a QCL reference signal (which is the CSI-RS 2) of QCL-Type D associated with the CORESET 1, and then a reception beam of a PDSCH may be determined according to the CSI-RS 2. On symbols 0, 8, 9 and 11, according to a conventional PDSCH QCL assumption determination method, the UE may preferentially receive the CORESET 0 by means of the reception beam of the CSI-RS 1 on the symbol 0 and preferentially receive the CORESET 2 by means of the reception beam of the CSI-RS 3 on the symbols 8, 9 and 11. A schematic diagram of determined reception beams of a PDSCH is shown in FIG. 9.

Exemplary Embodiment 8

In the case where the preset condition is satisfied, the reference signal is determined according to a QCL reference signal of a first QCL type associated with a second-type CORESET; and a QCL assumption of a PDSCH is determined according to the reference signal.

In some exemplary implementations, the preset condition includes at least one of the following:

a time interval between the PDSCH and a PDCCH for scheduling the PDSCH is less than a preset threshold;

the PDSCH conflicts with the second-type CORESET on at least one symbol; and a QCL reference signal of a first QCL type associated with the PDSCH is different from a QCL reference signal of a first QCL type associated with the second-type CORESET.

Figure 10:
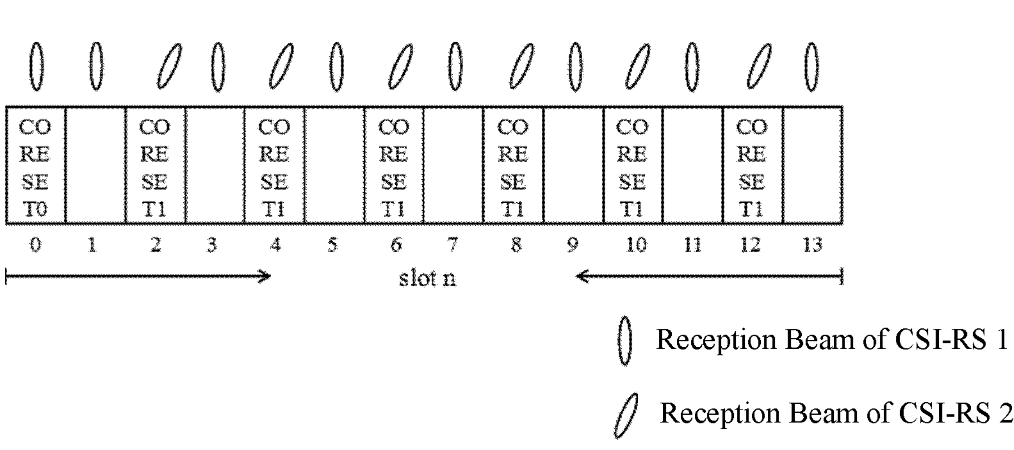
FIG. 10 is a schematic diagram V of the reception beam of the PDSCH according to the embodiments of the present disclosure.

For example, for a slot n, the slot includes 14 (time domain) symbols with symbol indexes of 0 to 13. In addition, the slot has 2 CORESETs: CORESET 0 and CORESET 1, where the CORESET 0 is located on symbol 0; and the CORESET 1 is located on symbols 2, 4, 6, 8, 10 and 12. QCL reference signals of QCL-Type D associated with the CORESET 0 and CORESET 1 are CSI-RS 1 and CSI-RS 2 respectively. Assuming that the PDSCH is located in all symbols on the slot n, the time interval between the PDSCH and the PDCCH for scheduling the PDSCH is less than a preset threshold, and on symbols 0, 2, 4, 6, 8, 10 and 12, PDSCH DM-RS conflicts with PDCCH 1 DM-RS (located on the CORESET 0) and PDCCH 2 DM-RS (located on the CORESET 1) (or overlaps in time domain), according to a conventional PDSCH QCL assumption determination method, the QCL reference signal of QCL-Type D associated with the PDSCH is the CSI-RS 1. In this case, the QCL reference signal (CSI-RS 1) of the QCL-Type D associated with the PDSCH is different from the QCL reference signal (CSI-RS 2) of the QCL-Type D associated with the CORESET 1, that is, the second-type CORESET is the CORESET 0. Therefore, on the symbols 2, 4, 6, 8, 10 and 12, the UE may determine a reception beam of the PDSCH according to the CSI-RS 2. A schematic diagram of determined reception beams of a PDSCH is shown in FIG. 10.

Exemplary Embodiment 9

In the case where the preset condition is satisfied, an RE on a first-type symbol on a latest slot not available for a PDSCH, specifically, "RE is not available for PDSCH" means that there is no PDSCH on the RE.

In some exemplary implementations, the preset condition includes:

a time interval between the PDSCH and a PDCCH for scheduling the PDSCH is less than a preset threshold.

In some exemplary implementations, the first-type symbol satisfies at least one of the following features:

the PDSCH conflicts with the PDCCH on the first-type symbol;

a QCL reference signal of a first QCL type associated with the PDSCH is different from a QCL reference signal of a first QCL type associated with the PDCCH on the first-type symbol;

the PDSCH conflicts with CSI-RS on the first-type symbol;

a QCL reference signal of a first QCL type associated with the PDSCH is different from a QCL reference signal of a first QCL type associated with CSI-RS on the first-type symbol;

The first-type symbol belongs to symbols that are occupied by a search space associated with a CORESET with a non-minimum CORESET ID.

In some exemplary implementations, CSI-RS includes at least one of AP-CSI-RS, semi-persistent CSI-RS and periodic CSI-RS.

Figure 11:
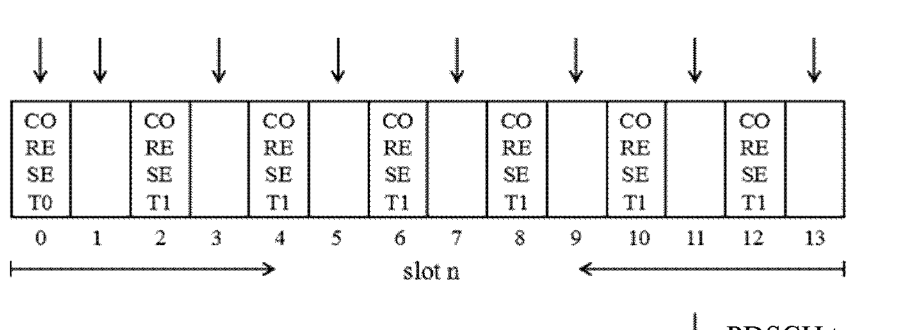
FIG. 11 is a schematic diagram of a slot according to the embodiments of the present disclosure.

For example, as shown in FIG. 11, for a slot n, the slot includes 14 (time domain) symbols with symbol indexes of 0 to 13. In addition, the slot has 2 CORESETs: CORESET 0 and CORESET 1, where the CORESET 0 is associated with PDCCH 1 and located on symbol 0; and the CORESET 1 is associated with PDCCH 2 and located on symbols 2, 4, 6, 8, 10 and 12. QCL reference signals of QCL-Type D associated with the PDCCH 1 and PDCCH 2 are CSI-RS 1 and CSI-RS 2 respectively. Assuming that the PDSCH is located in all symbols on the slot n, and the time interval between the PDSCH and the PDCCH for scheduling the PDSCH is less than a preset threshold, according to a conventional PDSCH QCL assumption determination method, the QCL reference signal of QCL-Type D associated with the PDSCH may be determined to be the CSI-RS 1, on symbols 2, 4, 6, 8, 10 and 12, PDSCH conflicts with PDCCH 2, the QCL reference signal (CSI-RS 1) of the QCL-Type D associated with the PDSCH is different from the QCL reference signal (CSI-RS 2) of the QCL-Type D associated with the PDCCH 2, that is, the first-type symbol is the symbols 2, 4, 6, 8, 10 and 12. In addition, symbols that are occupied by a search space associated with a CORESET (CORESET 2) with a non-minimum CORESET ID are 2, 4, 6, 8, 10 and 12, that is, the first-type symbol belongs to symbols that are occupied by a search space associated with a CORESET with a non-minimum CORESET ID. In this case, REs on the first-type symbols (the symbols 2, 4, 6, 8, 10, 12) on the slot n are not available for the PDSCH.

Exemplary Embodiment 10

The UE receives first information sent from a base station, where the first information is configured to indicate that a PDSCH is located on a first-type symbol set or a second-type symbol set.

In some exemplary implementations, the first-type symbol set includes: symbols occupied by a search space associated with a CORESET with a minimum CORESET ID in a latest slot, and symbols occupied by no search space associated with the CORESET; and the second-type symbol set includes symbols that are occupied by a search space associated with a CORESET with a non-minimum CORESET ID in the latest slot.

In some exemplary implementations, the first information is located on a PDCCH for scheduling the PDSCH.

Figure 12:
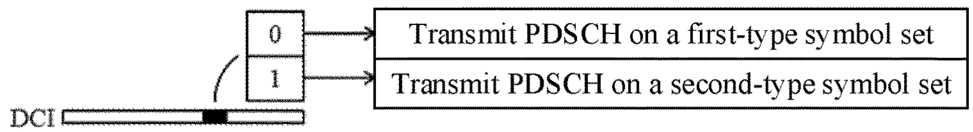
FIG. 12 is a schematic diagram of a first information domain according to the embodiments of the present disclosure.

For example, for a slot n, the slot includes 14 (time domain) symbols with symbol indexes of 0 to 13. In addition, the slot has 2 CORESETs: CORESET 0 and CORESET 1, where the CORESET 0 is located on symbol 0; and the CORESET 1 is located on symbols 2, 4, 6, 8, 10 and 12. It may be seen that in the embodiment, the first-type symbol set includes symbols 0, 1, 3, 5, 7, 9, 11 and 13, and the second-type symbol set includes symbols 2, 4, 6, 8, 10 and 12. Assuming that the base station sends the first information to the UE on the PDCCH, that is, DCI on the PDCCH includes a first information domain, which may occupy 1 bit as shown in FIG. 12. Specifically, "0" is configured to indicate that the PDSCH scheduled by the PDCCH is located in the first-type symbol set; and "1" is configured to indicate that the PDSCH scheduled by the PDCCH is located in the second-type symbol set.

Exemplary Embodiment 11

A fifth reference signal is determined according to a QCL reference signal of a first QCL type associated with a CORESET with a minimum CORESET ID on a latest slot, specifically, the "first QCL type" includes at least one of QCL-Type A or QCL-Type D;

a QCL assumption of a first-type PDSCH is determined according to the fifth reference signal;

a sixth reference signal is determined according to a QCL reference signal of a first QCL type associated with a TCI state indicated by DCI for scheduling a PDSCH; and a QCL assumption of a second-type PDSCH is determined according to the sixth reference signal.

The first-type PDSCH and the second-type PDSCH both belong to a first-type PDSCH set.

In some exemplary implementations, the first-type PDSCH set includes K PDSCHs or K times of repeated transmission of PDSCHs, where K refers to an integer greater than or equal to 1.

In some exemplary implementations, K is less than KMax, where KMax refers to the maximum number of repeated transmissions of PDSCHs supported in a slot reported by the UE.

In some exemplary implementations, in a case where a sixth preset condition is satisfied, K is equal to J (for example, J is equal to 1), where the sixth preset condition includes: a time interval between a PDSCH and a PDCCH for scheduling the PDSCH is less than a preset threshold.

In some exemplary implementations, the first-type PDSCH satisfies at least one of the following features:

the first-type PDSCH includes an Lth PDSCH or an Lth time of repeated transmission of PDSCHs in the first-type PDSCH set, where L refers to an integer greater than or equal to 0 or less than or equal to K; and a time interval between the first-type PDSCH and a PDCCH for scheduling the first-type PDSCH is less than a preset threshold.

In some exemplary implementations, the second-type PDSCH satisfies at least one of the following features:

the second-type PDSCH includes an Mth PDSCH or an Mth time of repeated transmission of PDSCHs in the first-type PDSCH set, where M is an integer greater than or equal to 0 or less than or equal to K; and a time interval between the second-type PDSCH and a PDCCH for scheduling the second-type PDSCH is greater than or equal to a preset threshold.

Figure 13:
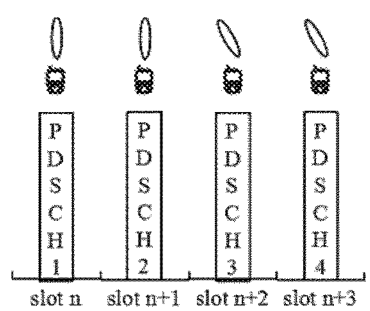
FIG. 13 is a schematic diagram I of a relation between a reception beam and a slot according to the embodiments of the present disclosure.

For example, at a specific moment, the UE receives DCI (located on the PDCCH) sent from a base station, and the DCI schedules 4 PDSCHs (K=4): PDSCH 1, PDSCH 2, PDSCH 3 and PDSCH 4, which are located on slot n, slot n+1, slot n+2 and slot n+3 sequentially as shown in FIG. 13, where PDSCH 2 to PDSCH 4 may be repeated transmissions of the PDSCH 1 (that is, transmitted data is consistent). A TCI domain on the DCI indicates a TCI state, and a QCL reference signal of QCL-Type D associated with the TCI state is CSI-RS 2. In addition, the slot n has CORESET: CORESET 0 with a minimum CORESET ID, and a QCL reference signal of related QCL-Type D is CSI-RS 1. Assuming that a time interval between a first PDSCH (that is, PDSCH 1) and a PDCCH for scheduling the PDSCH is less than the preset threshold and L may be equal to 1, and time intervals between the PDSCH 2, PDSCH 3 and PDSCH 4 and the PDCCH for scheduling the PDSCH are all greater than or equal to the preset threshold and M may be equal to 2, 3 and 4, the UE may determine a QCL assumption of the PDSCH 1 according to the CSI-RS 1, that is, the PDSCH 1 has consistent received spatial parameters (or reception beams) with the CSI-RS 1; and the UE may determine QCL assumptions of the PDSCH 2, PDSCH 3 and PDSCH 4 according to the CSI-RS 2, that is, the PDSCH 2, PDSCH 3 and PDSCH 4 have consistent received spatial parameters (or reception beams) with the CSI-RS 2.

Figure 14:
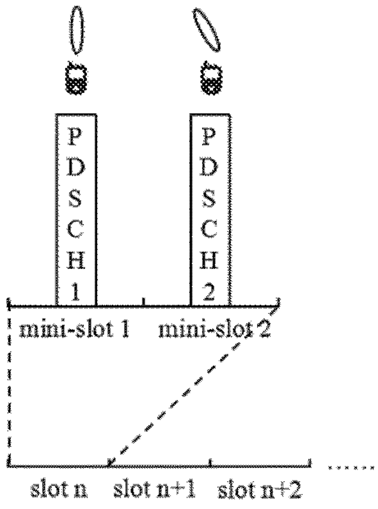
FIG. 14 is a schematic diagram III of the reception beam of the PDSCH according to the embodiments of the present disclosure.

For example, at a specific moment, the UE receives DCI (located on the PDCCH) sent from the base station, and the DCI schedules 2 PDSCHs (K=2): PDSCH 1 and PDSCH 2, which are located on mini-slot 1 and mini-slot 2 sequentially as shown in FIG. 14, where PDSCH 2 may be repeated transmission of the PDSCH 1 (that is, transmitted data is consistent). A TCI domain on the DCI indicates a TCI state, and a source reference signal of QCL-Type D associated with the TCI state is CSI-RS 2. In addition, the slot n has CORESET: CORESET 0 with a minimum CORESET ID, and the CSI-RS 1 supplies QCL-Type D to a PDCCH associated with the CORESET 0. Assuming that a time interval between a first PDSCH (that is, PDSCH 1) and a PDCCH for scheduling the PDSCH is less than the preset threshold and L may be equal to 1, and a time interval between the PDSCH 2 and the PDCCH for scheduling the PDSCH is greater than or equal to the preset threshold and M may be equal to 2, the UE may determine a QCL assumption of the PDSCH 1 according to the CSI-RS 1, that is, the PDSCH 1 has consistent received spatial parameters (or reception beams) with the CSI-RS 1; and the UE may determine a QCL assumption of the PDSCH 2 according to the CSI-RS 2, that is, the PDSCH 2 has consistent received spatial parameters (or reception beams) with the CSI-RS 2.

Exemplary Embodiment 12

A fifth reference signal is determined according to a QCL reference signal of a first QCL type associated with a CORESET with a minimum CORESET ID on a latest slot, specifically, the "first QCL type" includes at least one of QCL-Type A or QCL-Type D;

a QCL assumption of a first-type PDSCH is determined according to the fifth reference signal;

a sixth reference signal is determined according to a QCL reference signal of a first QCL type associated with a first TCI state indicated by DCI for scheduling a PDSCH;

a QCL assumption of a second-type PDSCH is determined according to the sixth reference signal;

a seventh reference signal is determined according to a QCL reference signal of a first QCL type associated with a second TCI state indicated by the DCI for scheduling the PDSCH; and a QCL assumption of a third-type PDSCH is determined according to the seventh reference signal.

The first-type PDSCH, the second-type PDSCH and the third-type PDSCH all belong to a first-type PDSCH set.

In some exemplary implementations, the first-type PDSCH set includes K PDSCHs or K times of repeated transmission of PDSCHs, where K refers to an integer greater than or equal to 1.

In some exemplary implementations, K is less than KMax, where KMax refers to the maximum number of repeated transmissions of PDSCHs supported in a slot reported by the UE.

In some exemplary implementations, in a case where a sixth preset condition is satisfied, K is equal to J (for example, J is equal to 1), where the sixth preset condition includes: a time interval between a PDSCH and a PDCCH for scheduling the PDSCH is less than a preset threshold.

In some exemplary implementations, the first-type PDSCH satisfies at least one of the following features:

the first-type PDSCH includes an Lth PDSCH or an Lth time of repeated transmission of PDSCHs in the first-type PDSCH set, where L refers to an integer greater than or equal to 0 or less than or equal to K; and a time interval between the first-type PDSCH and a PDCCH for scheduling the first-type PDSCH is less than a preset threshold.

In some exemplary implementations, the second-type PDSCH satisfies at least one of the following features:

the second-type PDSCH includes an Mth PDSCH or an Mth time of repeated transmission of PDSCHs in the first-type PDSCH set, where M is an integer greater than or equal to 0 or less than or equal to K; and a time interval between the second-type PDSCH and a PDCCH for scheduling the second-type PDSCH is greater than or equal to a preset threshold.

In some exemplary implementations, the third-type PDSCH satisfies at least one of the following features:

the third-type PDSCH includes an Nth PDSCH or an Nth time of repeated transmission of PDSCHs in the first-type PDSCH set, where N is an integer greater than or equal to 0 or less than or equal to K; and a time interval between the third-type PDSCH and a PDCCH for scheduling the third-type PDSCH is greater than or equal to a preset threshold.

Figure 15:
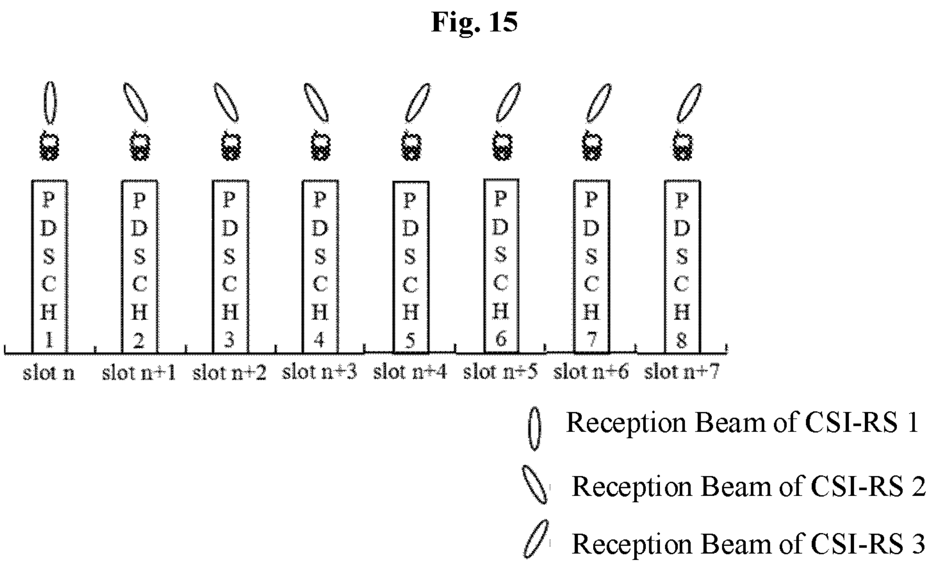
FIG. 15 is a schematic diagram II of a relation between a reception beam and a slot according to the embodiments of the present disclosure.

For example, at a specific moment, the UE receives DCI (located on the PDCCH) sent from a base station, and the DCI schedules 8 PDSCHs (K=8): PDSCH 1, PDSCH 2, PDSCH 3, PDSCH 4, PDSCH 5, PDSCH 6, PDSCH 7 and PDSCH 8, which are located on slot n, slot n+1, slot n+2, slot n+3, slot n+4, slot n+5, slot n+6 and slot n+7 sequentially as shown in FIG. 15, where PDSCH 2 to PDSCH 8 may be repeated transmissions of the PDSCH 1 (that is, transmitted data is consistent). A TCI domain on the DCI indicates 2 TCI states, a first TCI state refers to a TCI state with a minimum TCI state ID and a QCL reference signal of QCL-Type D associated with the TCI state is CSI-RS 2; and a second TCI state refers to a TCI state with a maximum TCI state ID and a QCL reference signal of QCL-Type D associated with the TCI state is CSI-RS 3. In addition, the slot n has CORESET: CORESET 0 with a minimum CORESET ID, and a QCL reference signal of related QCL-Type D is CSI-RS 1. Assuming that a time interval between a first PDSCH (that is, PDSCH 1) and a PDCCH for scheduling the PDSCH is less than the preset threshold and L may be equal to 1, and time intervals between the PDSCH 2 to PDSCH 8 and the PDCCH for scheduling the PDSCHs are all greater than or equal to the preset threshold and M and N may be both equal to 2, 3, 4, 5, 6, 7 and 8, where the M and N satisfy conditions of M=2, 3, 4, and N=5, 6, 7, 8 respectively, the UE may determine a QCL assumption of the PDSCH 1 according to the CSI-RS 1, that is, the PDSCH 1 has consistent received spatial parameters (or reception beams) with the CSI-RS 1; the UE may determine QCL assumptions of the PDSCH 2, PDSCH 3 and PDSCH 4 according to the CSI-RS 2, that is, the PDSCH 2, PDSCH 3 and PDSCH 4 have consistent received spatial parameters (or reception beams) with the CSI-RS 2; and the UE may determine QCL assumptions of the PDSCH 5, PDSCH 6, PDSCH 7 and PDSCH 8 according to the CSI-RS 3, that is, the PDSCH 5, PDSCH 6, PDSCH 7 and PDSCH 8 have consistent received spatial parameters (or reception beams) with the CSI-RS 3.

Figure 16:
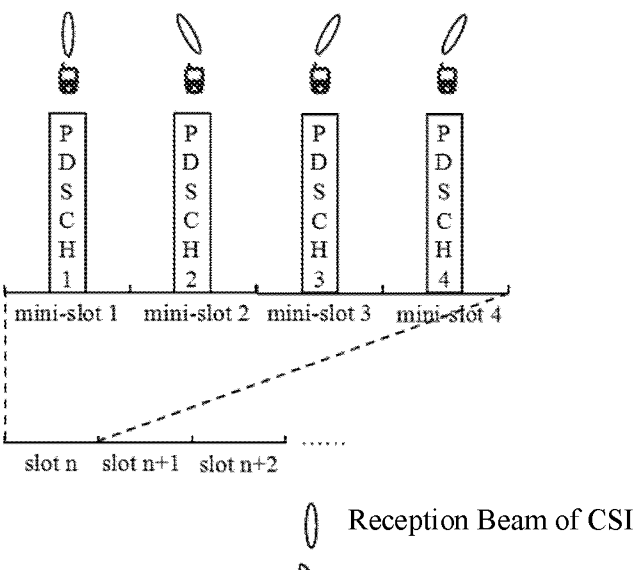
FIG. 16 is a schematic diagram III of a relation between a reception beam and a slot according to the embodiments of the present disclosure.

For example, at a specific moment, the UE receives DCI (located on the PDCCH) sent from the base station, and the DCI schedules 4 PDSCHs (K=4): PDSCH 1, PDSCH 2, PDSCH 3 and PDSCH 4, which are located on mini-slot 1, mini-slot 2, mini-slot 3 and mini-slot 4 sequentially as shown in FIG. 16, where PDSCH 2 to PDSCH 4 may be repeated transmissions of the PDSCH 1 (that is, transmitted data is consistent). A TCI domain on the DCI indicates 2 TCI states, a first TCI state refers to a TCI state with a minimum TCI state ID and a source reference signal of QCL-Type D associated with the TCI state is CSI-RS 2; and a second TCI state refers to a TCI state with a maximum TCI state ID and a source reference signal of QCL-Type D associated with the TCI state is CSI-RS 3. In addition, the slot n has CORESET: CORESET 0 with a minimum CORESET ID, and the CSI-RS 1 supplies QCL-Type D to a PDCCH associated with the CORESET 0. Assuming that a time interval between a first PDSCH (that is, PDSCH 1) and a PDCCH for scheduling the PDSCH is less than the preset threshold and L may be equal to 1, and time intervals between the PDSCH 2 to PDSCH 4 and the PDCCH for scheduling the PDSCHs are all greater than or equal to the preset threshold and M and N may be equal to 2, 3 and 4, where the M and N satisfy conditions of M=2, and N=3, 4 respectively, the UE may determine a QCL assumption of the PDSCH 1 according to the CSI-RS 1, that is, the PDSCH 1 has consistent received spatial parameters (or reception beams) with the CSI-RS 1; the UE may determine a QCL assumption of the PDSCH 2 according to the CSI-RS 2, that is, the PDSCH 2 has consistent received spatial parameters (or reception beams) with the CSI-RS 2; and the UE may determine QCL assumptions of the PDSCH 3 and PDSCH 4 according to the CSI-RS 3, that is, the PDSCH 3 and PDSCH 4 have consistent received spatial parameters (or reception beams) with the CSI-RS 3.

Embodiment 13

The number of DM-RS port groups associated with a PDSCH is less than or equal to L, and L is an integer greater than or equal to 1.

In some exemplary implementations, L is less than or equal to the number of TCI states corresponding to a first codepoint.

For example, DCI located on a CORESET (or PDCCH) of CC 1 is configured to schedule a PDSCH of CC 2, the PDSCH is associated with L (L≥1) DM-RS port groups. By means of an activation command (i.e. an MAC-CE signaling), the base station activates a TCI state set for a PDSCH receiving CC 2, and the TCI state set includes N(N≥1) TCI states. 1 codepoint corresponds to M(1≤M≤N) TCI states in N TCI states, specifically, regarding the "codepoint", assuming that the DCI includes 1 TCI domain occupying 2 bits, which may specifically be 00, 01, 10 and 11. 00 indicates a first TCI state in the TCI state set (which is a TCI state with a minimum TCI state ID), and so on. 00, 01, 10 and 11 are codepoints, 00 refers to a first codepoint, and so on. In the embodiment, assumed that there are 4 codepoints: 00, 01, 10 and 11, the number of TCI states corresponding to the first codepoint "00" is M, assuming that M is equal to 2, the number of DM-RS port groups associated with a PDSCH of CC 2 scheduled by DCI of CC 1 is less than or equal to 2, that is, the number of DM-RS port groups associated with a PDSCH is 1 or 2.

Exemplary Embodiment 14

In the embodiments, a CC or CC group may also be applied to a BWP or BWP group. A configuration mode of the CC group or BWP group may include at least one of the following:

- all CCs or BWPs in broadband are specified as a CC or BWP group;
- the base station configures the CC or BWP group by means of the RRC signal;
- UE reports the CC or BWP group as a capability, for example, different CCs or BWPs send downlink reference signals or channels (i.e. CSI-RS, PDCCH and PDSCH) to the same UE, and in a case where the downlink channels or signals overlap in a time domain (for example, starting positions overlap), the UE may report the CC or BWP indexes associated with the downlink channels or signals, that is, the CC or BWP group includes CCs or BWPs corresponding to the CC or BWP indexes; and
- the UE reports measurement results, for example, for multiple CCs or BWPs, each CC or BWP is configured with a CSI-RS set, the UE obtains a CSI-RS corresponding to a maximum reference signal receive power (RSRP) in each CC or BWP by measuring RSRP of the CSI-RS in each CC or BWP, CCs or BWPs with consistent CSI-RS reception beam direction or within a preset range may serve as a CC or BWP group, and then the UE reports the CC or BWP indexes.

In some exemplary implementations, the number of CCs or BWPs included in a CC or BWP group is less than or equal to Nmax, and Nmax refers to the maximum number of CCs or BWPs that the UE is capable of supporting.

Exemplary Embodiment 15

A specific serving cell schedules 1 PDSCH through DCI (or PDCCH), the PDSCH is associated with 2 port groups: PDSCH DM-RS 1 and PDSCH DM-RS 2, the serving cell activates, by means of activation commands (i.e. an MAC-CE signaling), 1 TCI state set, and a mapping table between TCI codepoints and TCI states in the TCI state set is as shown in Table 3. Assuming that a time interval between the PDSCH and a PDCCH for scheduling the PDSCH is less than a preset threshold, the UE may determine the QCL reference signal of the PDSCH according to a CORESET group corresponding to the PDSCH and a QCL reference signal of a first QCL type associated with B TCI states corresponding to P predetermined TCI codepoints. L may be a positive integer greater than or equal to 1, B is less than or equal to A, and A refers to the number of TCI states corresponding to P predetermined items.

In some exemplary implementations, the P predetermined items may be P lowest TCI codepoints, or P lowest TCI codepoints in a codepoint set, wherein the number of TCI states of each codepoint in the codepoint set is greater than a preset value, or P lowest TCI codepoints in a codepoint set, wherein the number of TCI states of each codepoint in the codepoint set is less than or equal to a preset value. Assuming 1 lowest TCI codepoint in a codepoint set, the number of TCI states corresponding the codepoint set being greater than 1 herein, which is a second TCI codepoint: "001", the UE may determine a QCL assumption of PDSCH DM-RS 1 according to TCI state 3 and determine a QCL assumption of PDSCH DM-RS 2 according to TCI state 4, where B=1 and A=2.

In some exemplary implementations, a P value and a B value are associated with at least one of the following information:

- the number of CORESET groups included in a serving cell for scheduling a PDSCH;
- the number of port groups included in the PDSCH;
- the maximum number of port groups included in the PDSCH;
- the maximum number of data channels (i.e. PDSCH) received on the same time domain symbol in a serving cell;
- the number of channels received on the same time domain symbol in a serving cell; and
- the number of channel scrambling parameters configured in a serving cell.

In some exemplary implementations, a DM-RS port group corresponds to a TCI state, and different DM-RS port groups correspond to different TCI states.

Exemplary Embodiment 16

Serving cell 1 schedules a PDSCH on a certain serving cell through PDCCH 1. Assuming that a time interval between the PDSCH and PDCCH 1 for scheduling the PDSCH is less than a preset threshold, in a case where a serving cell where the PDSCH is located is different from serving cell 1, the UE may determine a QCL assumption of the PDSCH according to first-type parameters; and in a case where a serving cell where the PDSCH is located is different from the serving cell 1, the UE may determine the QCL assumption of the PDSCH according to first-type parameters.

In some exemplary implementations, the first-type parameters and second-type parameters satisfy at least one of the following features:

- a difference set of the first-type parameters and the second-type parameters is non-empty; and
- a difference set of the first-type parameters and the second-type parameters includes:
- a mapping table between TCI codepoints and a TCI states; and
- an activated TCI state set.

In some exemplary implementations, the UE may determine whether the difference set of the first-type parameters and the second-type parameters is empty according to the number of DM-RS port groups included in the PDSCH.

Exemplary Embodiment 17

An aperiodic CSI-RS 1 is on serving cell 1, and a PDSCH is on serving cell 2. Assuming that a time interval between the PDSCH and a PDCCH for scheduling the PDSCH is less than a preset threshold, the UE may determine a QCL assumption of the PDSCH according to a QCL reference signal associated with CORESET that is latest to an aperiodic CSI-RS and satisfies predetermined features, that is, acquisition parameters of the QCL assumption of the PDSCH include a QCL reference signal associated with a CORESET that is on a slot latest to the aperiodic CSI-RS and satisfies the predetermined features.

Exemplary Embodiment 18

Serving cell 1 schedules PDSCH 2 on serving cell 2 through PDCCH 1. Assuming that a time interval between the PDSCH 2 and PDCCH 1 for scheduling the PDSCH 2 is less than a preset threshold, acquisition parameters assumed by QCL of the PDSCH 2 do not include a QCL reference signal associated with a CORESET that is on a slot latest to a DM-RS of the PDSCH 2 and satisfies predetermined features, that is, the UE cannot determine a QCL assumption of the PDSCH 2 according to the QCL reference signal associated with the CORESET that is on the slot latest to the DM-RS of the PDSCH 2 and satisfies the predetermined features.

From the description of the above embodiments, it will be apparent to those skilled in the art that the methods according to the embodiments described above may be achieved by means of software plus a necessary general-purpose hardware platform, and of course may also be achieved by means of hardware, but in many cases the former is a better embodiment. With such understanding, the technical solution of the embodiments of the present disclosure, in essence or from the view of part contributing to the prior art, may be embodied in the form of a software product, where the computer software product is stored in a storage medium (i.e. a read only memory (ROM)/random access memory (RAM), a magnetic disk and an optical disk) and includes multiple instructions configured to make a terminal device (which may be a mobile phone, a computer, a server, a network device, etc.) conduct the method in each of the embodiments of the present disclosure.

Some embodiments of the present disclosure provide a configuration device, which is configured to realize the above embodiments and preferred embodiments, and will not be repeated herein. The term "module", as used below, may achieve a combination of software and/or hardware with predetermined functions. While the device described in the following embodiments is preferably realized in software, achievement of hardware, or a combination of software and hardware, is also possible and conceivable.

Figure 17:
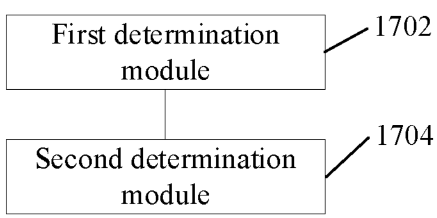
FIG. 17 is a structural schematic diagram of an information determination device according to exemplary embodiments of the present disclosure.

FIG. 17 is a structural block diagram of the configuration device according to embodiments of the present disclosure. as shown in FIG. 17, the device includes: an information determination device, which includes: a first determination module 1702 configured to determine a reference signal in a case where a preset condition is satisfied; and a second determination module 1704 configured to determine information of a downlink signal or downlink channel according to the reference signal.

It should be noted that the various modules described above may be realized by software or hardware, achievement by hardware may be implemented as follows but are not limited thereto: the modules described above are located in the same processor; or the modules described above are separately located in different processors in any combination form.

Some embodiments of the present disclosure provide a storage medium, which stores a computer program, where the computer program is configured to execute the operations of any one of the above mentioned method embodiments at runtime.

In some exemplary implementations of the embodiment, the storage medium described above may be configured to store a computer program to execute the operations:

S1, a reference signal is determined in a case where a preset condition is satisfied; and S2, information of a downlink signal or downlink channel is determined according to the reference signal.

In some exemplary implementations of the embodiment, the storage medium described above may include, but not limited to, a universal serial bus flash disk, ROM, RAM, a removable hard disk, a magnetic disk, or an optical disk, and various media that may store the computer program.

Some embodiments of the present disclosure provide an electronic device, which includes a memory and a processor, where the memory stores a computer program, and the processor is configured to run a computer program to execute the operations of any one of the above-described method embodiments.

In some exemplary implementations, the electronic device may further include a transmission device and an input/output device, where the transmission device is connected to the processor described above and the input/output device is connected to the processor described above.

In some exemplary implementations of the embodiment, the processor described above may be configured to execute, by means of the computer program, the following operations:

S1, a reference signal is determined in a case where a preset condition is satisfied; and S2, information of a downlink signal or downlink channel is determined according to the reference signal.

Obviously, those skilled in the art will appreciate that the modules or operations of the embodiments of the present disclosure described above may be realized with a general-purpose computation device, and may be centralized on a single computation device or distributed on a network composed of multiple computation devices, optionally, they may be realized with program codes executable by the computation device, such that they may be stored in a storage device to be executed by the computation device, and under some conditions, the operations shown or described may be executed in an order different from that herein, or they may be fabricated separately as individual integrated circuit modules, or multiple modules or operations of them may be fabricated as a single integrated circuit module for realization. Thus, the embodiments of the present disclosure are not limited to any particular combination of hardware and software.

The above has been described only as preferred embodiments of the present disclosure and is not intended to limit the present disclosure, which can be modified and changed, for those skilled in the art. Any modifications, equivalent replacements, improvements, etc. made within the principles of the present disclosure should fall within the scope of protection of the present disclosure.

What is claimed is:

1. An information determination method comprising:

determining a reference signal in a case where a preset condition is satisfied, wherein the preset condition comprises at least one of Transmission Configuration Indicator (TCI) states configured in a frequency domain bandwidth where a downlink signal or downlink channel is located comprises a quasi-colocated (QCL) reference signal associated with a spatial reception parameter; and determining a QCL assumption of the downlink signal or downlink channel according to the reference signal, wherein the reference signal is determined according to a relation between a carrier where a control channel for scheduling the downlink signal or downlink channel is located and a carrier where the downlink signal or downlink channel is located, wherein determining the reference signal according to the relation between the carrier where the control channel for scheduling the downlink signal or downlink channel is located and the carrier where the downlink signal or downlink channel is located comprises:

acquiring the reference signal according to first-type parameters in a case where the carrier where the control channel for scheduling the downlink signal or downlink channel is located is different from the carrier where the downlink signal or downlink channel is located; and acquiring the reference signal according to second-type parameters in a case where the carrier where the control channel for scheduling the downlink signal or downlink channel is located is the same as the carrier where the downlink signal or downlink channel is located, wherein the first-type parameters and the second-type parameters are different; and wherein the information determination method further comprises determining the reference signal according to a type of the downlink signal and the relation between the carrier where the control channel for scheduling the downlink signal or downlink channel is located and the carrier where the downlink signal or downlink channel is located, wherein determining the reference signal according to the type of the downlink signal and the relation between the carrier where the control channel for scheduling the downlink signal or downlink channel is located and the carrier where the downlink signal or downlink channel is located comprises:

in a case where the downlink signal comprises an aperiodic measurement reference signal, and the carrier where the aperiodic measurement reference signal is located is different from the carrier where the control channel for scheduling the aperiodic measurement reference signal is located, acquisition parameters of the reference signal comprise a QCL reference signal of Control Resource Set (CORESET) that satisfies a predetermined feature and is included in a time unit latest to the aperiodic measurement reference signal in the carrier where the aperiodic measurement reference signal is located;

in a case where the downlink signal comprises a demodulation reference signal of a downlink data channel, and the carrier where the downlink data channel is located is different from the carrier where the control channel for scheduling the downlink data channel is located, acquisition parameters of the reference signal do not comprise a QCL reference signal of CORESET that satisfies the predetermined feature and is included in a time unit latest to the downlink data channel in a carrier where the demodulation reference signal of the downlink data channel is located, wherein the CORESET that satisfies the predetermined feature is CORESET with a minimum CORESET identifier (ID) in the time unit.

2. The method according to claim 1, wherein the preset condition further comprises at least one of the following:

a time interval between the downlink signal or downlink channel and a control channel for scheduling the downlink signal or downlink channel is less than a preset threshold;

the control channel for scheduling the downlink signal or downlink channel does not comprise a TCI indication domain.

3. A non-transitory computer-readable storage medium, storing a computer program, wherein the computer program is configured to execute the method according to claim 1 at runtime.

4. An electronic device, comprising a memory and a processor, wherein the memory stores a computer program, and the processor is configured to run the computer program to execute the method according to claim 1.

5. The method according to claim 1, further comprising determining the reference signal according to a QCL reference signal included in B TCI states, wherein the B TCI states are from A TCI states corresponding to one predetermined TCI codepoint in a mapping table between a TCI codepoint and a TCI state, wherein A is a positive integer greater than 1, B is a positive integer less than A, and the one predetermined TCI codepoint is a lowest TCI codepoint in a TCI codepoint set in the mapping table, wherein the number of TCI states of each TCI codepoint in the TCI codepoint set is equal to a preset value.

6. The method according to claim 5, wherein at least one of following information is associated with the B value:

the number of CORESET groups included in a frequency domain bandwidth for scheduling the downlink signal or downlink channel;

the number of port groups included in the downlink signal;

the maximum number of port groups included in the downlink signal, wherein one port group corresponds to one TCI state, and different port groups correspond to different TCI states;

the maximum number of data channels received on a same time domain symbol in one frequency domain bandwidth;

the number of channels received on a same time domain symbol in one frequency domain bandwidth; or the number of channel scrambling parameters configured in one frequency domain bandwidth.

7. The method according to claim 5, wherein the mapping table is determined in a following manner:

determining, from N CORESET groups, a CORESET group including a control channel corresponding to the downlink signal or downlink channel, wherein N is larger than 1; and determining, from N mapping tables between the TCI codepoint and the TCI state, a mapping table corresponding to the CORESET group.

8. The method according to claim 7, wherein the N CORESET groups correspond to the N mapping tables between the TCI codepoint and the TCI state;

each CORESET group in the N CORESET groups corresponds to one of the N mapping tables between the TCI codepoint and the TCI state;

wherein the N CORESET groups are located in one frequency domain bandwidth, and data channels corresponding to the N mapping tables are located in one frequency domain bandwidth; and the one frequency domain bandwidth is one bandwidth part.

9. The method according to claim 8, wherein the preset condition further comprises the number of CORESET groups included in a frequency domain bandwidth where the control channel for scheduling the downlink signal or downlink channel is located is greater than 1 and at least one of the following:

a time interval between the downlink signal or downlink channel and a control channel for scheduling the downlink signal or downlink channel is less than a preset threshold;

the control channel for scheduling the downlink signal or downlink channel does not comprise a TCI indication domain;

the downlink signal or channel and a control channel for scheduling the downlink signal or channel are in different carriers.

10. An information determination device, comprising a memory storing instructions and a processor in communication with the memory, wherein the processor is configured to execute the instructions to:

determine a reference signal in a case where a preset condition is satisfied, wherein the preset condition comprises at least one of Transmission Configuration Indicator (TCI) states configured in a frequency domain bandwidth where a downlink signal or downlink channel is located comprises a quasi-colocated (QCL) reference signal associated with a spatial reception parameter; and determine a QCL assumption of the downlink signal or downlink channel according to the reference signal, wherein the processor is further configured to execute the instructions to determine the reference signal according to a relation between a carrier where the control channel for scheduling the downlink signal or downlink channel is located and a carrier where the downlink signal or downlink channel is located in a following manner:

acquiring the reference signal according to first-type parameters in a case where the carrier where the control channel for scheduling the downlink signal or downlink channel is located is different from the carrier where the downlink signal or downlink channel is located; and acquiring the reference signal according to second-type parameters in a case where the carrier where the control channel for scheduling the downlink signal or downlink channel is located is the same as the carrier where the downlink signal or downlink channel is located, wherein the first-type parameters and the second-type parameters are different; and wherein the processor is further configured to execute the instructions to determine the reference signal according to a type of the downlink signal and the relation between the carrier where the control channel for scheduling the downlink signal or downlink channel is located and the carrier where the downlink signal or downlink channel is located in a following manner:

in a case where the downlink signal comprises an aperiodic measurement reference signal, and the carrier where the aperiodic measurement reference signal is located is different from the carrier where the control channel for scheduling the aperiodic measurement reference signal is located, acquisition parameters of the reference signal comprise a QCL reference signal of Control Resource Set (CORESET) that satisfies a predetermined feature and is included in a time unit latest to the aperiodic measurement reference signal in the carrier where the aperiodic measurement reference signal is located;

in a case where the downlink signal comprises a demodulation reference signal of a downlink data channel, and the carrier where the downlink data channel is located is different from the carrier where the control channel for scheduling the downlink data channel is located, acquisition parameters of the reference signal do not comprise a QCL reference signal of CORESET that satisfies the predetermined feature and is included in a time unit latest to the downlink data channel in a carrier where the demodulation reference signal of the downlink data channel is located, wherein the CORESET that satisfies the predetermined feature is CORESET with a minimum CORESET identifier (ID) in the time unit.

11. The device according to claim 10, wherein the preset condition further comprises at least one of the following:

a time interval between the downlink signal or downlink channel and a control channel for scheduling the downlink signal or downlink channel is less than a preset threshold;

the control channel for scheduling the downlink signal or downlink channel does not comprise a TCI indication domain.

12. The device according to claim 10, wherein the processor is further configured to execute the instructions to determine the reference signal according to a QCL reference signal included in B TCI states, wherein the B TCI states are from A TCI states corresponding to one predetermined TCI codepoint in a mapping table between a TCI codepoint and a TCI state, wherein A is a positive integer greater than 1, B is a positive integer less than A, and the one predetermined TCI codepoint is a lowest TCI codepoint in a TCI codepoint set in the mapping table, wherein the number of TCI states of each TCI codepoint in the TCI codepoint set is equal to a preset value.

13. The device according to claim 12, wherein at least one of following information is associated with the B value:

the number of CORESET groups included in a frequency domain bandwidth for scheduling the downlink signal or downlink channel;

the number of port groups included in the downlink signal;

the maximum number of port groups included in the downlink signal, wherein one port group corresponds to one TCI state, and different port groups correspond to different TCI states;

the maximum number of data channels received on a same time domain symbol in one frequency domain bandwidth;

the number of channels received on a same time domain symbol in one frequency domain bandwidth; or the number of channel scrambling parameters configured in one frequency domain bandwidth.

14. The device according to claim 12, wherein the processor is further configured to determine the mapping table in a following manner:

determining, from N CORESET groups, a CORESET group including a control channel corresponding to the downlink signal or downlink channel, wherein N is larger than 1; and determining, from N mapping tables between the TCI codepoint and the TCI state, a mapping table corresponding to the CORESET group.

15. The device according to claim 14, wherein the N CORESET groups correspond to the N mapping tables between the TCI codepoint and the TCI state;

each CORESET group in the N CORESET groups corresponds to one of the N mapping tables between the TCI codepoint and the TCI state;

wherein the N CORESET groups are located in one frequency domain bandwidth, and data channels corresponding to the N mapping tables are located in one frequency domain bandwidth; and the one frequency domain bandwidth is one bandwidth part.

16. The device according to claim 15, wherein the preset condition further comprises the number of CORESET groups included in a frequency domain bandwidth where the control channel for scheduling the downlink signal or downlink channel is located is greater than 1 and at least one of the following:

a time interval between the downlink signal or downlink channel and a control channel for scheduling the downlink signal or downlink channel is less than a preset threshold;

the control channel for scheduling the downlink signal or downlink channel does not comprise a TCI indication domain;

the downlink signal or channel and a control channel for scheduling the downlink signal or channel are in different carriers.

* * * * *